US008632062B2

(12) United States Patent
James

(10) Patent No.: US 8,632,062 B2
(45) Date of Patent: Jan. 21, 2014

(54) ELASTOMERIC HIGH CAPACITY LAMINATED ROTARY WING AIRCRAFT BEARING FOR ROTARY WING AIRCRAFT

(75) Inventor: Frank O. James, Girard, PA (US)

(73) Assignee: Lord Corporation, Cary, NC (US)

( * ) Notice: Subject to any disclaimer, the term of this patent is extended or adjusted under 35 U.S.C. 154(b) by 267 days.

(21) Appl. No.: 12/953,399

(22) Filed: Nov. 23, 2010

(65) Prior Publication Data

US 2011/0206303 A1  Aug. 25, 2011

Related U.S. Application Data

(60) Provisional application No. 61/263,553, filed on Nov. 23, 2009.

(51) Int. Cl.
F16F 7/00 (2006.01)
(52) U.S. Cl.
USPC .......... 267/141.1; 267/140.2; 267/140.4; 267/294; 416/134 A; 416/140
(58) Field of Classification Search
USPC ........ 267/294, 140.2, 140.4, 141.1; 384/221, 384/222; 29/898.04, 898.15; 416/134 A, 416/134 R, 140
See application file for complete search history.

(56) References Cited

U.S. PATENT DOCUMENTS

| | | | |
|---|---|---|---|
| 3,134,445 A | 5/1964 | Hotchkiss | |
| 3,258,805 A | 7/1966 | Rossnan | |
| 3,578,055 A | 5/1971 | French et al. | |
| 3,759,631 A | 9/1973 | Rybicki | |
| 3,759,632 A * | 9/1973 | Rybicki | 416/134 R |
| 3,778,189 A | 12/1973 | Ferris | |
| 3,814,160 A | 6/1974 | Creasey | |
| 3,941,433 A | 3/1976 | Dolling et al. | |
| 4,105,266 A * | 8/1978 | Finney | 384/221 |
| 4,142,833 A | 3/1979 | Rybicki et al. | |
| 4,244,677 A * | 1/1981 | Noehren et al. | 416/134 A |
| 4,251,187 A | 2/1981 | Hollrock | |
| 4,256,354 A | 3/1981 | Peterson | |
| 4,297,078 A | 10/1981 | Martin | |
| 4,352,632 A * | 10/1982 | Schwarz et al. | 416/134 A |
| 4,357,057 A | 11/1982 | Peterson et al. | |
| 4,365,936 A | 12/1982 | Hatch | |

(Continued)

FOREIGN PATENT DOCUMENTS

| | | |
|---|---|---|
| WO | 79/00033 A1 | 1/1979 |
| WO | 00/17047 A1 | 3/2000 |

OTHER PUBLICATIONS

Randolph Research, LamiFlex TM Hi-Load Rubber Laminate Bearings/Seals, www.randolphresearch.com, Nov. 10, 2009, 2 pages.

(Continued)

*Primary Examiner* — Thomas J Williams
*Assistant Examiner* — Mariano Sy
(74) *Attorney, Agent, or Firm* — Richard G. Miller

(57) ABSTRACT

An elastomeric high capacity laminated (HCL) bearing for rotary wing aircraft and method of making is provided. The elastomeric HCL bearing is mold bonded using structural adhesives with a given elastomeric subassembly tensile strength between a first metal first laminate end structural bond shim and a second metal distal laminate end structural bond shim. The structural adhesive has a limited elongation and a first end tensile strength ≥elastomeric subassembly tensile strength.

34 Claims, 19 Drawing Sheets

(56) References Cited

U.S. PATENT DOCUMENTS

| | | | |
|---|---|---|---|
| 4,373,862 A | 2/1983 | Ferris et al. | |
| 4,439,106 A | 3/1984 | Ferris et al. | |
| 4,836,029 A | 6/1989 | Skala et al. | |
| 4,886,419 A * | 12/1989 | McCafferty | 416/134 A |
| 4,895,354 A * | 1/1990 | Byrnes | 267/141.1 |
| 4,927,481 A | 5/1990 | McGregor | |
| 5,092,738 A * | 3/1992 | Byrnes et al. | 416/134 A |
| 5,188,513 A | 2/1993 | Byrnes | |
| 5,213,739 A | 5/1993 | Dickerson et al. | |
| 5,303,756 A | 4/1994 | Hill | |
| 5,399,309 A | 3/1995 | Simmons | |
| 5,460,487 A * | 10/1995 | Schmaling et al. | 416/134 A |
| 5,817,365 A | 10/1998 | Richardson et al. | |
| 5,894,682 A | 4/1999 | Broz | |
| 6,023,967 A | 2/2000 | Chung et al. | |
| 6,045,328 A * | 4/2000 | Jones | 416/140 |
| 6,695,583 B2 * | 2/2004 | Schmaling et al. | 416/107 |
| 6,848,886 B2 | 2/2005 | Schmaling et al. | |
| 6,922,916 B1 | 8/2005 | Potter et al. | |
| 6,971,853 B2 * | 12/2005 | Chemouni et al. | 416/134 A |
| 7,097,169 B2 * | 8/2006 | Mueller | 267/141.1 |
| 7,290,985 B2 * | 11/2007 | James et al. | 416/1 |
| 7,565,778 B2 | 7/2009 | Azeau | |
| 7,896,747 B2 | 3/2011 | Russell | |
| 8,167,561 B2 * | 5/2012 | Jones | 416/140 |
| 8,205,560 B2 | 6/2012 | East et al. | |
| 8,231,346 B2 * | 7/2012 | Stamps et al. | 416/83 |
| 2004/0208745 A1 | 10/2004 | Schmaling et al. | |
| 2005/0248191 A1 | 11/2005 | Azeau | |
| 2007/0231140 A1 | 10/2007 | James | |
| 2008/0023586 A1 | 1/2008 | Russell | |
| 2009/0162201 A1 * | 6/2009 | Cunningham et al. | 416/134 A |
| 2010/0199880 A1 | 8/2010 | East et al. | |
| 2012/0257847 A1 * | 10/2012 | Allred et al. | 384/221 |

OTHER PUBLICATIONS

Randolph Research, LamiFlex TM Bearings for Helicopter Blade Retention, www.randolphresearch.com/Thelbrg.htm, Nov. 10, 2009, 4 pages.

* cited by examiner

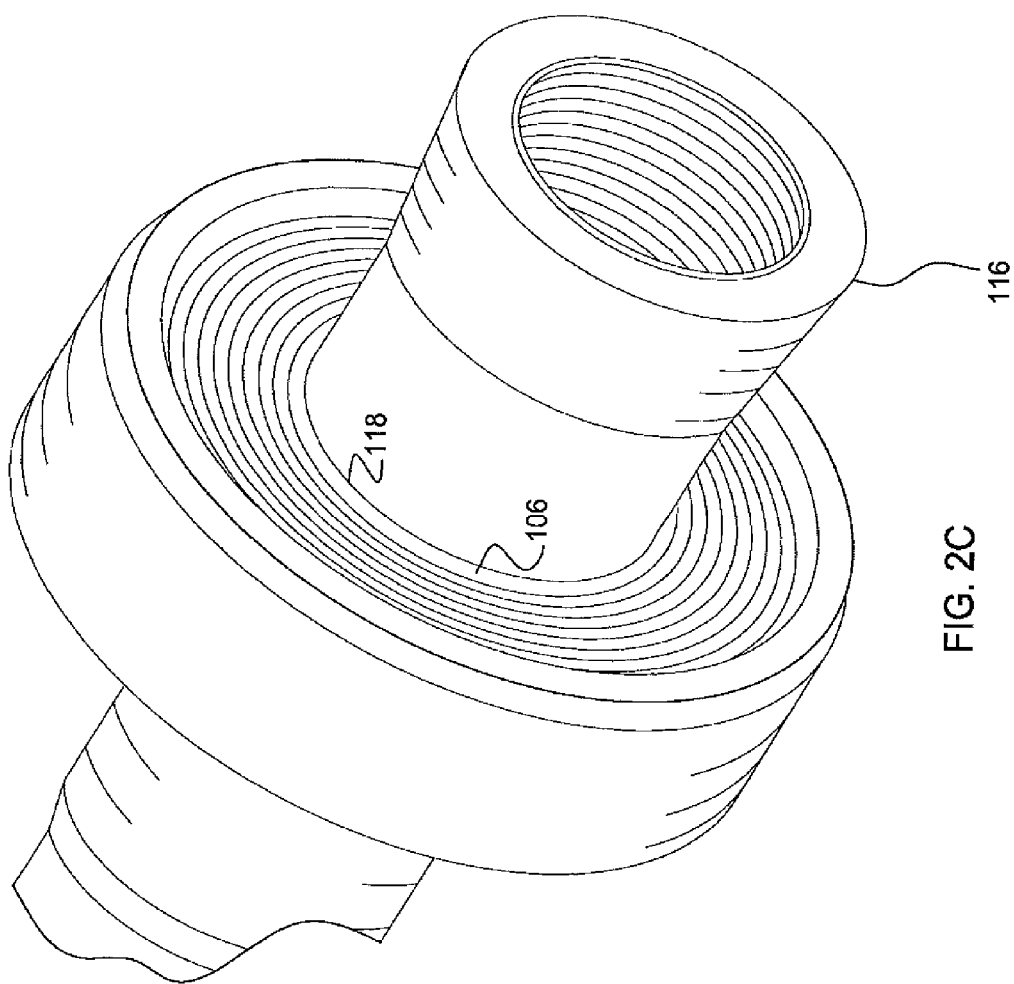

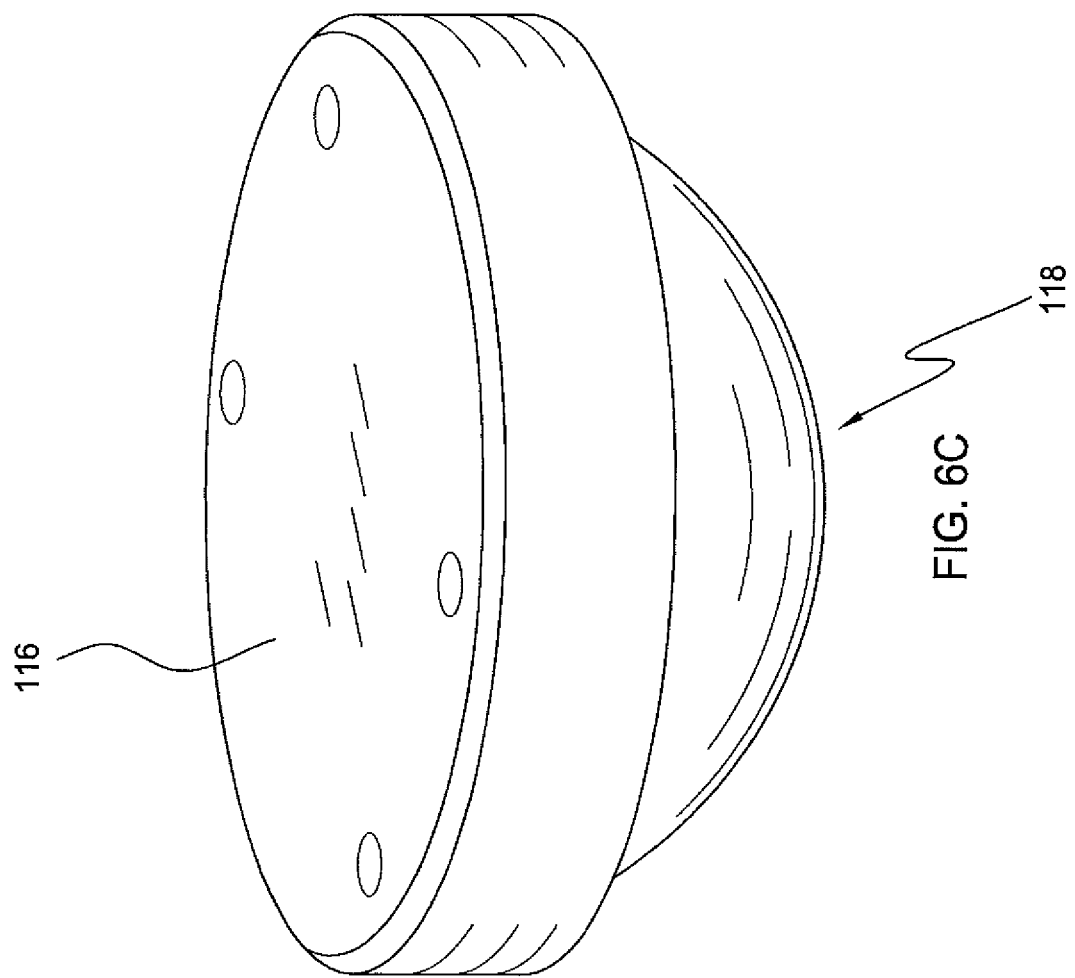

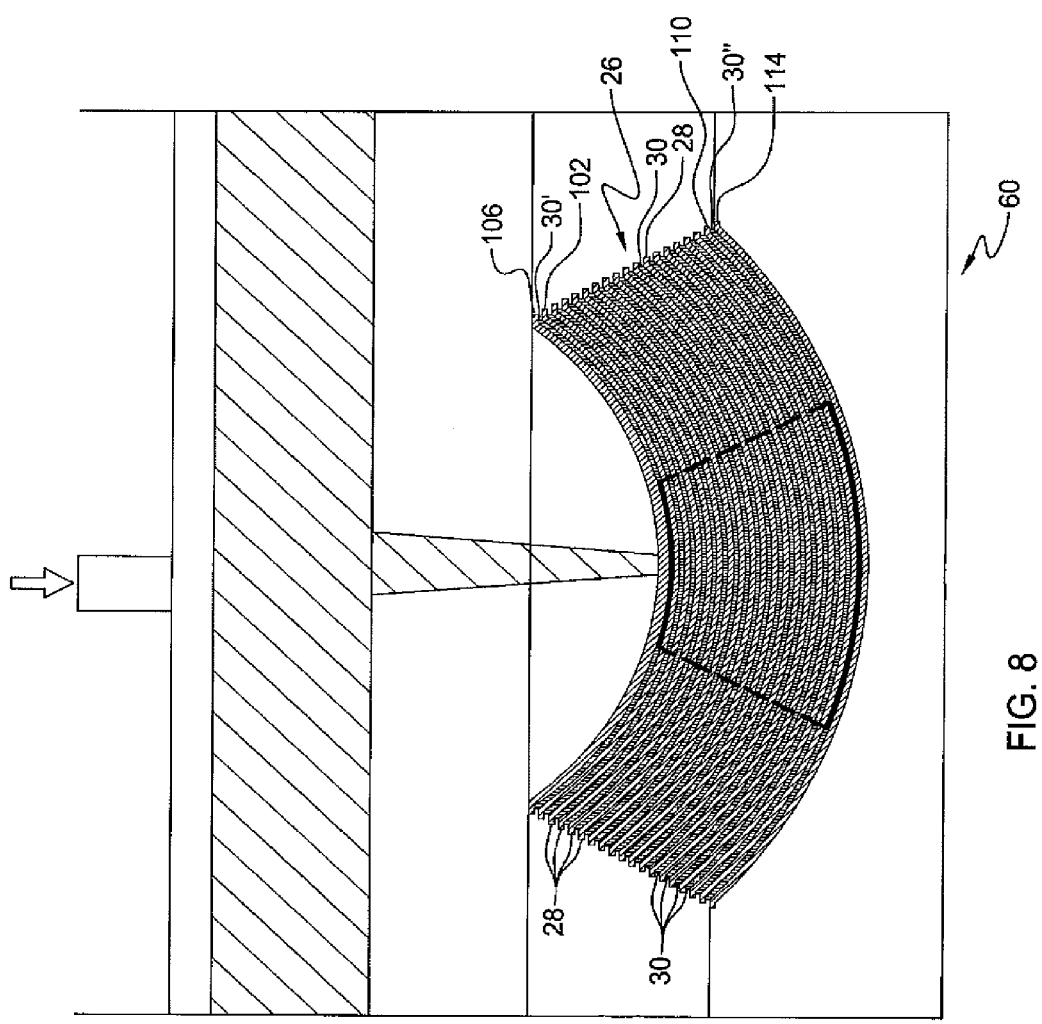

ELASTOMERIC HIGH CAPACITY LAMINATED ROTARY WING AIRCRAFT BEARING FOR ROTARY WING AIRCRAFT

This application claims the benefit of U.S. Provisional Application 61/263,553 filed on Nov. 23, 2009 (ELASTOMERIC HIGH CAPACITY LAMINATED ROTARY WING AIRCRAFT BEARING FOR ROTARY WING AIRCRAFT) which is herein incorporated by reference.

FIELD OF THE INVENTION

The invention relates to the field of rotary wing aircraft such as helicopters. The invention relates to the field of rotary wing aircraft bearings for connecting rotary wing vehicle members and providing relative motion between the connecting rotary wing vehicle members. More particularly the invention relates to the field of elastomeric high capacity laminated bearings for rotary wing aircraft.

SUMMARY OF THE INVENTION

In an embodiment the invention includes a rotary wing aircraft bearing to provide a constrained relative motion between a first rotary wing aircraft member and a second rotary wing aircraft member. The bearing includes an elastomeric mold bonded laminated subassembly, the elastomeric mold bonded laminated subassembly including a plurality of mold bonded alternating layers of interior nonelastomeric shim members and interior elastomeric shim members, the interior elastomeric shim members including a first laminate end elastomeric shim and a distal second laminate end elastomeric shim. The first laminate end elastomeric shim has a first side mold bonded to a first end interior nonelastomeric shim member and a second side mold bonded to a first metal first laminate end structural bond shim. The distal second laminate end elastomeric shim having a first side mold bonded to a distal second end interior nonelastomeric shim member and a second side mold bonded to a second metal distal laminate end structural bond shim, the elastomeric mold bonded laminated subassembly having an elastomeric subassembly tensile strength ESTS (preferably ≤1200 psi) between the first metal first laminate end structural bond shim and the second metal distal laminate end structural bond shim. The rotary wing aircraft bearing includes a first end bearing connector first metal member for connecting to the first rotary wing aircraft member, a first end structural chemical adhesive epoxy post-elastomeric mold bond between the first end bearing connector first metal member and the first metal first laminate end structural bond shim, the first end structural epoxy bond having an elongation of at least 11% and a first end tensile strength FETS with FETS≥ESTS. The rotary wing aircraft bearing includes a second end bearing connector second metal member for connecting to the second rotary wing aircraft member, a second end structural chemical adhesive epoxy post-elastomeric mold bond between the second end bearing connector second metal member and the second metal first laminate end structural bond shim, the second end structural epoxy bond having an elongation of at least 11%, and a second end tensile strength SETS with SETS≥ESTS.

In an embodiment the invention includes a method of making a rotary wing aircraft bearing to provide a constrained relative motion between a first rotary wing aircraft member and a second rotary wing aircraft member. The method includes providing an elastomeric subassembly bonding mold for receiving a plurality of alternating layers of interior nonelastomeric shim members and interior elastomeric shim members, a first metal first laminate end structural bond shim, and a second metal distal laminate end structural bond shim. The method includes providing a plurality of interior nonelastomeric shim members. The method includes providing a plurality of interior elastomeric shim members. The method includes providing a first metal first laminate end structural bond shim. The method includes providing a second metal distal laminate end structural bond shim. The method includes disposing the interior nonelastomeric shim members, the interior elastomeric shim members, the first metal first laminate end structural bond shim, and the second metal distal laminate end structural bond shim in the elastomeric subassembly bonding mold with the interior nonelastomeric shim members and the interior elastomeric shim members alternating and sandwiched between the first metal first laminate end structural bond shim and the second metal distal laminate end structural bond shim. The method includes mold bonding the interior nonelastomeric shim members, the interior elastomeric shim members, the first metal first laminate end structural bond shim and the second metal distal laminate end structural bond shim together in the elastomeric subassembly bonding mold to provide an elastomeric mold bonded laminated subassembly with the alternating layers of interior nonelastomeric shim members and interior elastomeric shim members sandwiched between the first metal first laminate end structural bond shim and the second metal distal laminate end structural bond shim, the elastomeric mold bonded laminated subassembly having an elastomeric subassembly tensile strength ESTS (≤1200 psi) between the first metal first laminate end structural bond shim and the second metal distal laminate end structural bond shim. The method includes providing a post-elastomeric mold bond structural chemical adhesive epoxy. The method includes providing a first end bearing connector first metal member for connecting to the first rotary wing aircraft member. The method includes providing a second end bearing connector second metal member for connecting to the second rotary wing aircraft member. The method includes bonding the first end bearing connector first metal member and the first metal first laminate end structural bond shim with the post-elastomeric mold bond structural chemical adhesive epoxy to provide a first end structural epoxy bond having an elongation of at least 11% and a first end tensile strength FETS (≥1200 psi). The method includes bonding the second end bearing connector second metal member and the second metal first laminate end structural bond shim with the post-elastomeric mold bond structural chemical adhesive epoxy to provide a second end structural epoxy bond having an elongation of at least 11%, and a second end tensile strength SETS (≥1200 psi) with SETS≥ESTS and FETS≥ESTS.

In an embodiment the invention includes a rotary wing aircraft bearing to provide a constrained relative motion between a first rotary wing aircraft member and a second rotary wing aircraft member. The bearing including an elastomeric mold bonded laminated subassembly, the elastomeric mold bonded laminated subassembly including a plurality of mold bonded alternating layers of interior nonelastomeric shim members and interior elastomeric shim members, the interior elastomeric shim members including a first laminate end elastomeric shim and a distal second laminate end elastomeric shim. The first laminate end elastomeric shim has a first side mold bonded to a first end interior nonelastomeric shim member and a second side mold bonded to a first metal first laminate end structural bond shim. The distal second laminate end elastomeric shim has a first side mold bonded to a distal second end interior nonelastomeric shim member and a second side mold bonded to a second metal distal end member, the elastomeric mold bonded laminated subassembly having an elastomeric subassembly tensile strength ESTS (≤1200 psi) between the first metal first laminate end structural bond shim and the second metal distal end member. The rotary wing aircraft bearing including a first end bearing connector first metal member for connecting to the first rotary wing aircraft member, a first end structural chemical adhesive epoxy post-elastomeric mold bond between the first end bearing connector first metal member and the first metal first laminate end structural bond shim, the first end structural epoxy bond having an elongation of at least of at least 11% and a first end tensile strength FETS≥ESTS. The second metal distal end member mechanically grounded to the second rotary wing aircraft member.

In an embodiment the invention includes a method of making a rotary wing aircraft bearing to provide a constrained relative motion between a first rotary wing aircraft member and a second rotary wing aircraft member. The method includes providing an elastomeric subassembly bonding mold for receiving a plurality of alternating layers of interior nonelastomeric shim members and interior elastomeric shim members, a first metal first laminate end structural bond shim, and a second metal distal end member. The method includes providing a plurality of interior nonelastomeric shim members. The method includes providing a plurality of interior elastomeric shim members. The method includes providing a first metal first laminate end structural bond shim. The method includes providing a second metal distal end member. The method includes disposing the interior nonelastomeric shim members, the interior elastomeric shim members, the first metal first laminate end structural bond shim, and the second metal distal end member in the elastomeric subassembly bonding mold with the interior nonelastomeric shim members and the interior elastomeric shim members alternating and sandwiched between the first metal first laminate end structural bond shim and the second metal distal end member. The method includes mold bonding the interior nonelastomeric shim members, the interior elastomeric shim members, the first metal first laminate end structural bond shim and the second metal distal end member together in the elastomeric subassembly bonding mold to provide an elastomeric mold bonded laminated subassembly with the alternating layers of interior nonelastomeric shim members and interior elastomeric shim members sandwiched between the first metal first laminate end structural bond shim and the second metal distal end member, the elastomeric mold bonded laminated subassembly having an elastomeric subassembly tensile strength ESTS between the first metal first laminate end structural bond shim and the second metal distal end member. The method includes providing a post-elastomeric mold bond structural chemical adhesive epoxy. The method includes providing a first end bearing connector first metal member for connecting to the first rotary wing aircraft member. The method includes bonding the first end bearing connector first metal member and the first metal first laminate end structural bond shim with the post-elastomeric mold bond structural chemical adhesive epoxy to provide a first end structural epoxy bond having an elongation of at least 11% and a first end tensile strength FETS with FETS≥ESTS.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

BRIEF DESCRIPTION OF THE DRAWINGS

FIG. 2A-C illustrate elastomeric laminated tubular bearings.

FIG. 6A-D illustrate spherical bearing elastomeric mold bonded laminated subassemblies between end bearing connector metal members with structural chemical adhesive post-elastomeric mold bonding between the end bearing connector metal members and the laminate end structural bond shims.

FIG. 8 illustrates an embodiment of making bearings with spherical bearing elastomeric mold bonded laminated subassemblies.

DETAILED DESCRIPTION OF THE PREFERRED EMBODIMENT

Figure 1A:
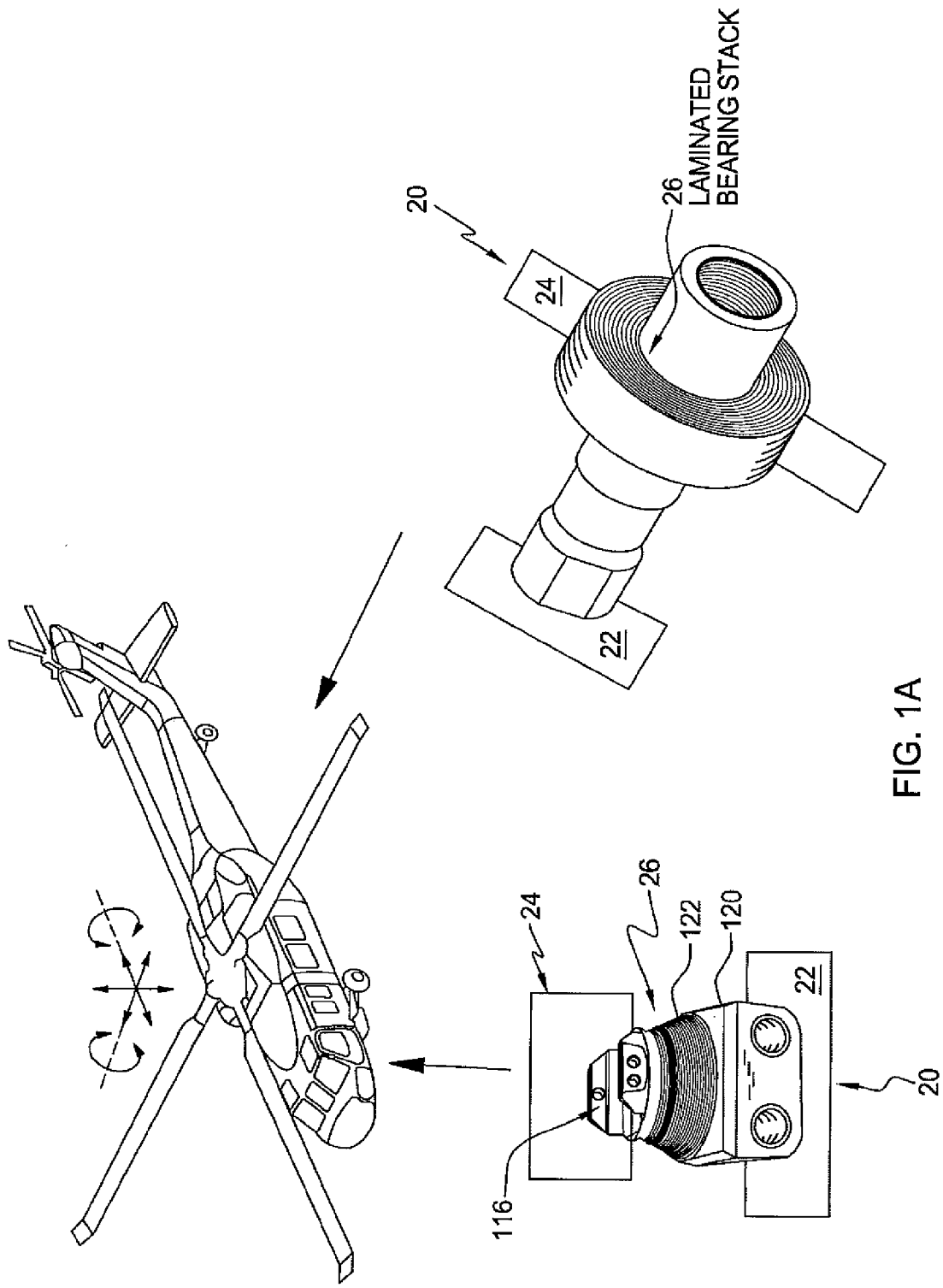
FIG. 1A-E illustrate rotary wing aircraft bearings providing constrained relative motion between rotary wing aircraft members.
Figure 1B:
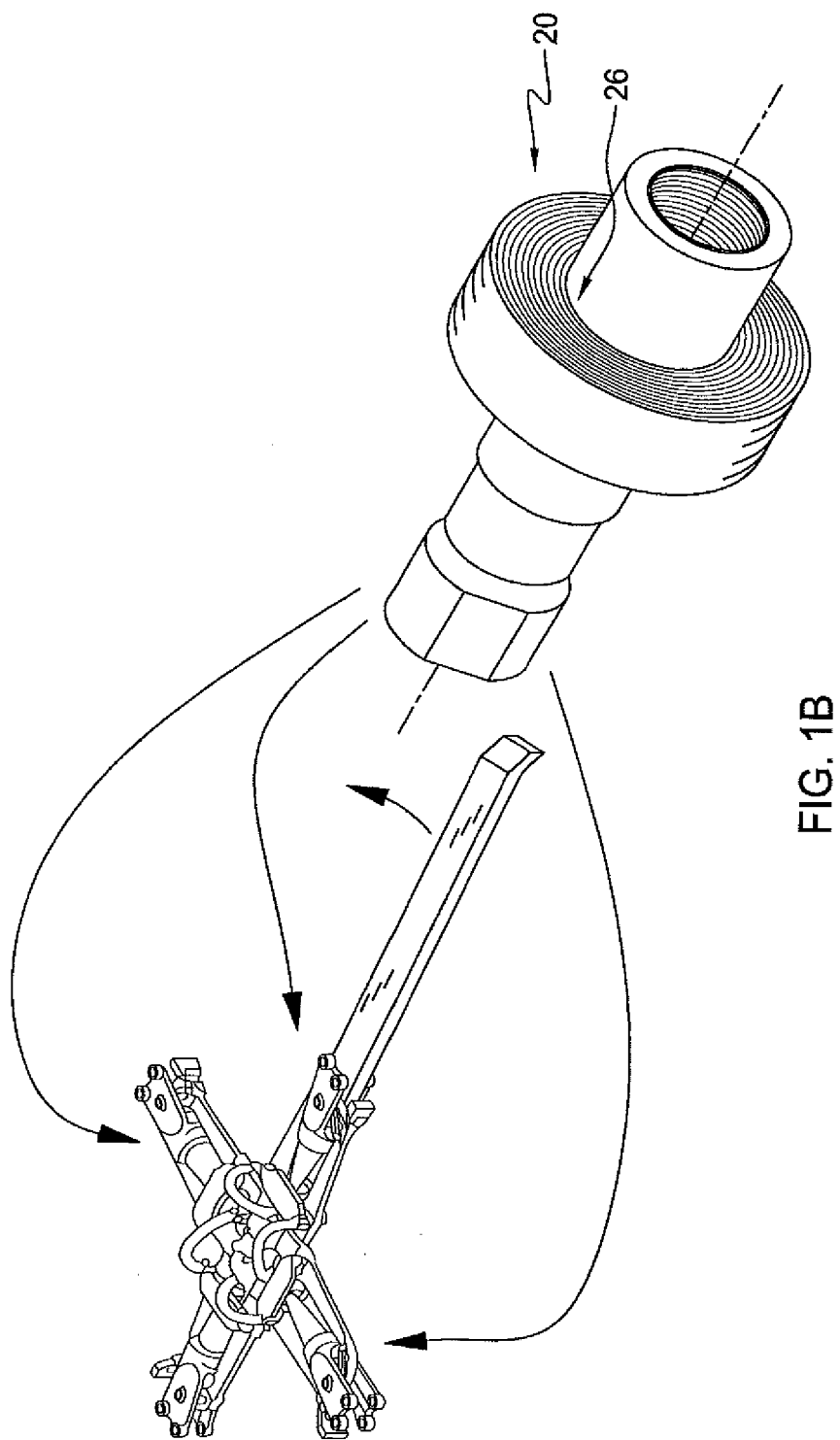
Figure 1C:
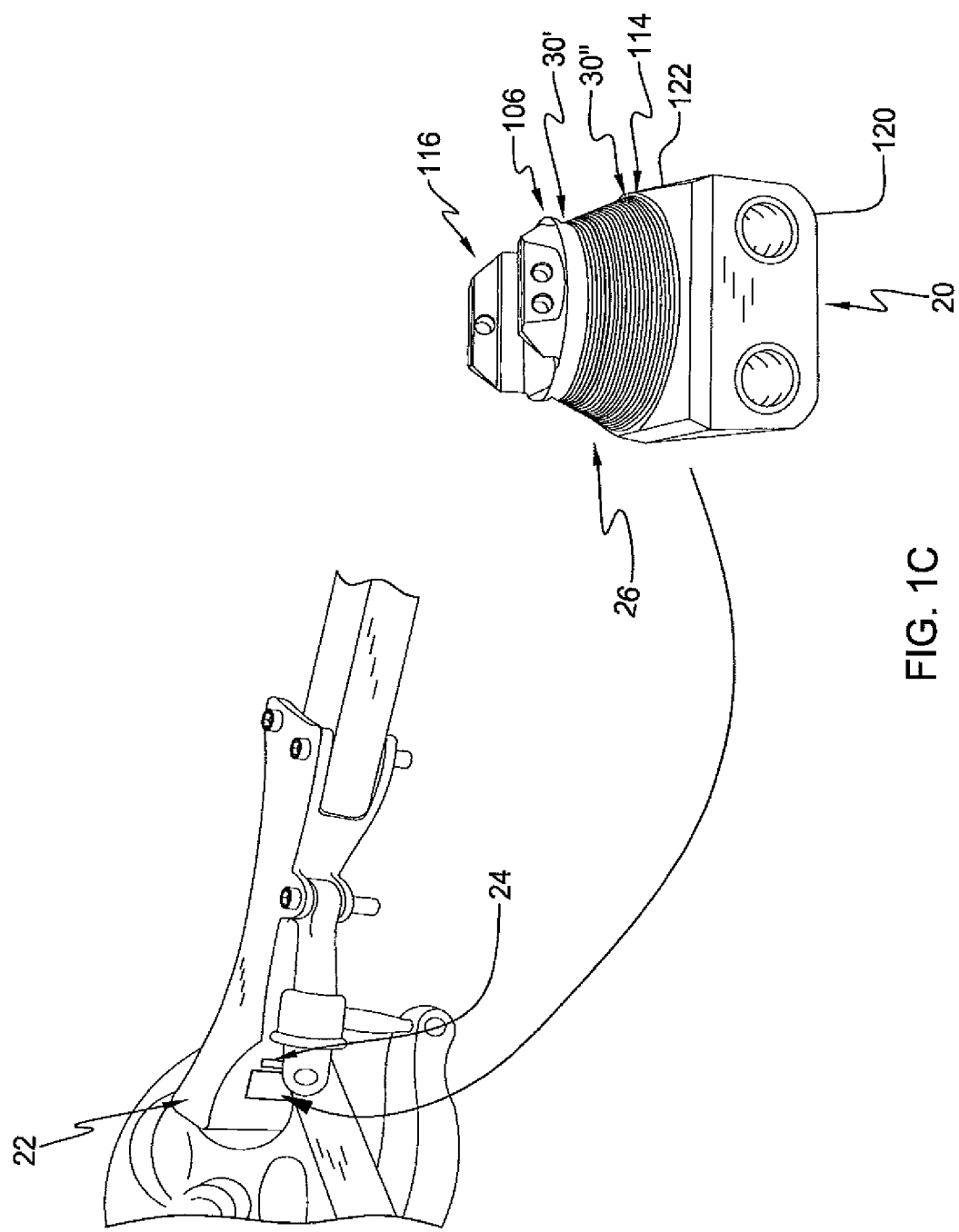
Figure 1D:
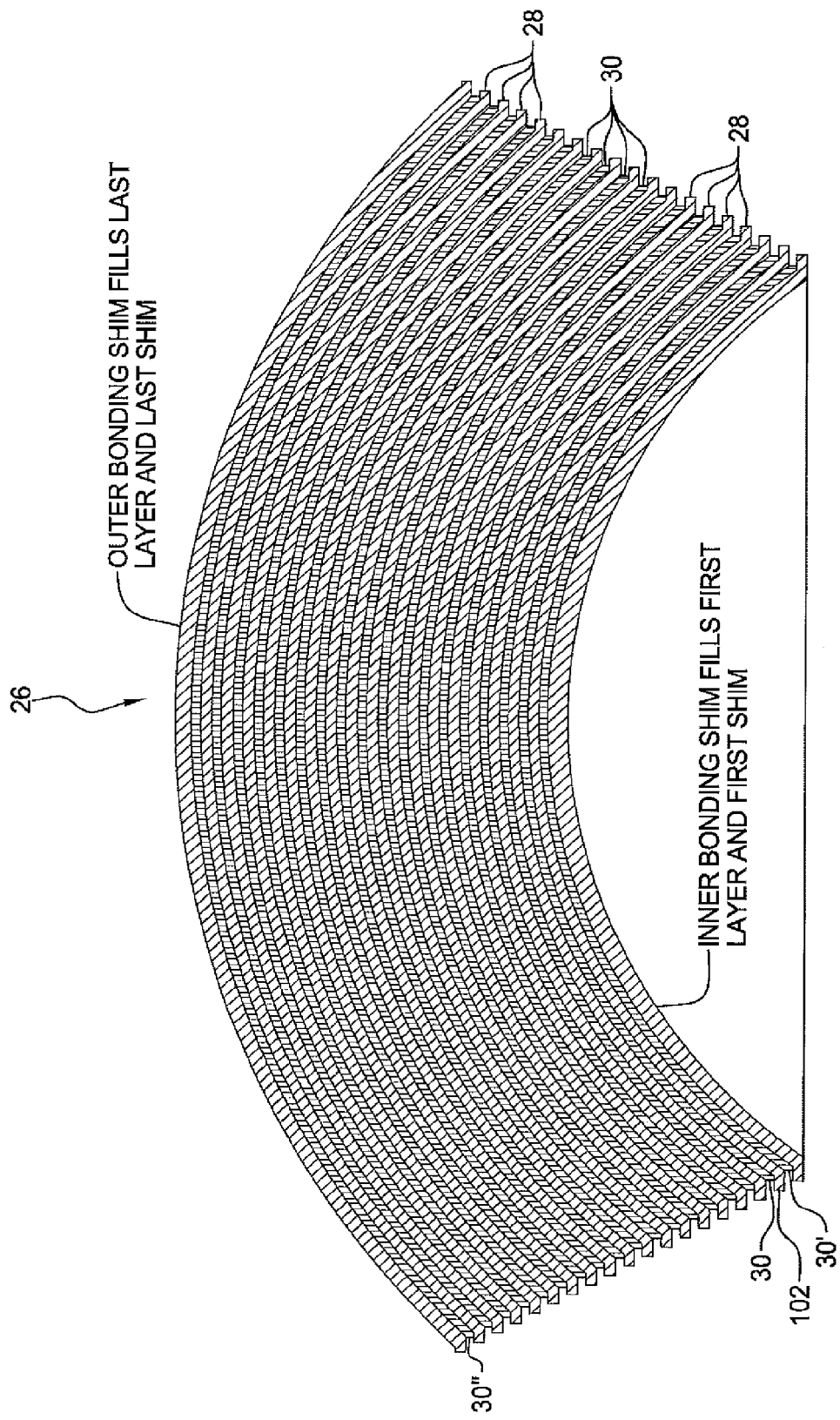
Figure 1E:
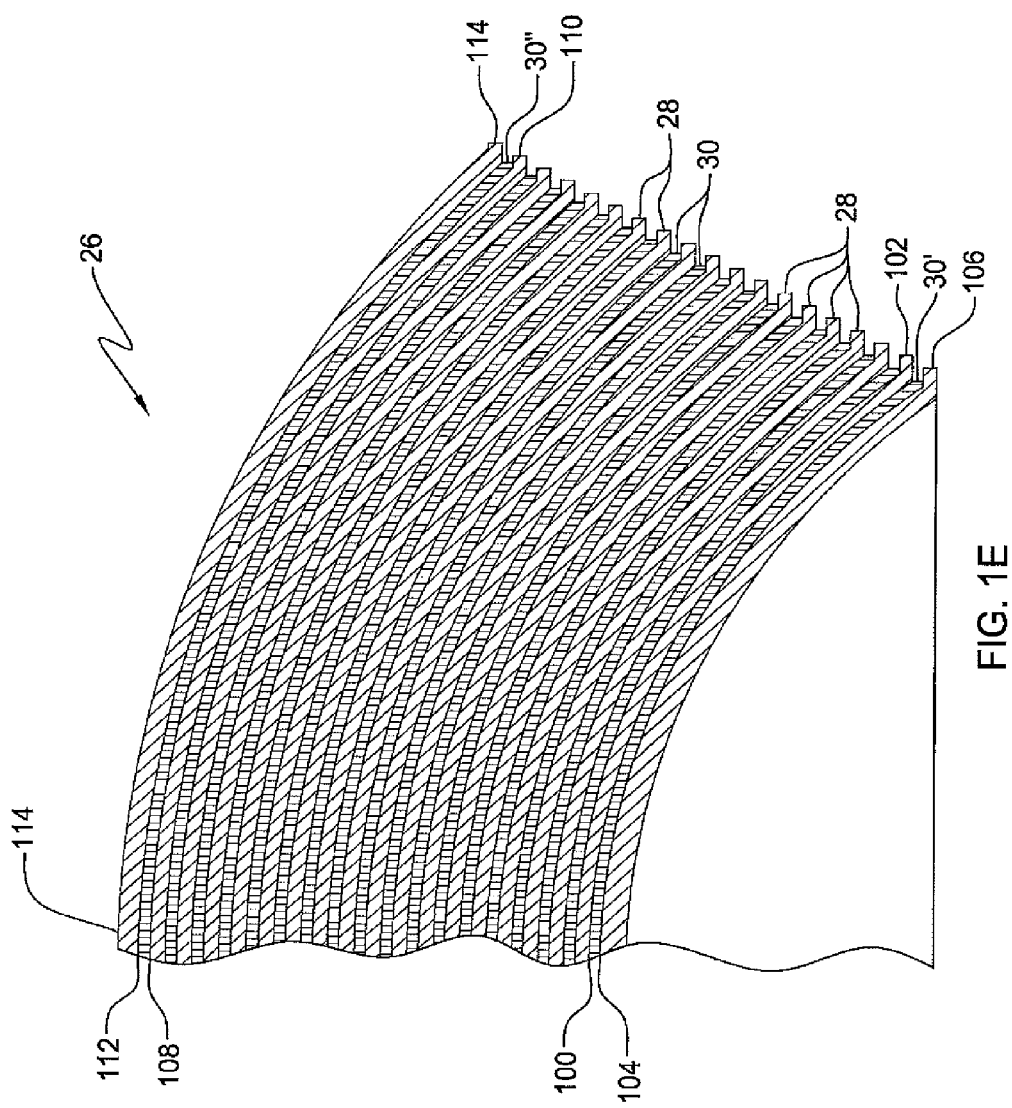

Additional features and advantages of the invention will be set forth in the detailed description which follows, and in part will be readily apparent to those skilled in the art from that description or recognized by practicing the invention as described herein, including the detailed description which follows, the claims, as well as the appended figures.

Reference will now be made in detail to the present preferred embodiments of the invention, examples of which are illustrated in the accompanying figures.

In an embodiment the invention includes a rotary wing aircraft bearing 20 to provide a constrained relative motion between a first rotary wing aircraft member 22 and a second rotary wing aircraft member 24. The bearing includes an elastomeric mold bonded laminated subassembly 26, the elastomeric mold bonded laminated subassembly 26 including a plurality of mold bonded alternating layers of interior nonelastomeric shim members 28 and interior elastomeric shim members 30, the interior elastomeric shim members 30 including a first laminate end elastomeric shim 30' and a distal second laminate end elastomeric shim 30". The first laminate end elastomeric shim 30' has a first side 100 mold bonded to a first end interior nonelastomeric shim member 102 and a second side 104 mold bonded to a first metal first laminate end structural bond shim 106. The distal second laminate end elastomeric shim 30" has a first side 108 mold bonded to a distal second end interior nonelastomeric shim member 110 and a second side 112 mold bonded to a second metal distal laminate end structural bond shim 114, the elastomeric mold bonded laminated subassembly 26 having an elastomeric subassembly tensile strength ESTS (preferably ESTS≤1200 psi) between the first metal first laminate end structural bond shim 106 and the second metal distal laminate end structural bond shim 114. The rotary wing aircraft bearing 20 includes a first end bearing connector first metal member 116 for connecting to the first rotary wing aircraft member, a first end structural chemical adhesive epoxy post-elastomeric mold bond 118 between the first end bearing connector first metal member 116 and the first metal first laminate end structural bond shim 106, the first end structural epoxy bond 118 having an elongation of at least 11%. Preferably the first end structural epoxy bond 118 has an elongation of at least at least 17%, preferably at least 19%, preferably with elongation ranges from 11 to 27%, preferably 17-26%, and preferably 19-25%. Preferably the first end structural epoxy bond 118 has a first end tensile strength FETS (preferably FETS≥1200 psi) with FETS≥ESTS. Preferably the first end structural epoxy bond 118 has a first end tensile strength FETS≥2500 psi, preferably ≥2750 psi, preferably ≥3000 psi, and preferably in the adhesive strength range of 3000 to 5000 psi in shear and tension. The rotary wing aircraft bearing 20 includes a second end bearing connector second metal member 120 for connecting to the second rotary wing aircraft member, a second end structural chemical adhesive epoxy post-elastomeric mold bond 122 between the second end bearing connector second metal member 120 and the second metal first laminate end structural bond shim 114, the second end structural epoxy bond 122 having an elongation of at least 11%. Preferably the second end structural epoxy bond 122 has an elongation of at least 17%, preferably at least 19%, preferably with elongation ranges from 11 to 27%, preferably 17-26%, and preferably 19-25%. Preferably the second end structural epoxy bond 122 has a second end tensile strength SETS (≥1200 psi, preferably ≥2500 psi, preferably ≥2750 psi, preferably ≥3000 psi, preferably in the adhesive strength range of 3000 to 5000 psi in shear and tension) with SETS≥ESTS. Preferably SETS≥1200 psi, preferably ≥2500 psi, preferably ≥2750 psi, preferably ≥3000 psi, preferably in the adhesive strength range of 3000 to 5000 psi in shear and tension. In an embodiment the first end structural chemical adhesive epoxy post-elastomeric mold bond is comprised of a spherical shell segment. Preferably the spherical shell segment consists essentially of a maintained thickness cured structural chemical adhesive in the shape of a segment of a spherical shell with a maintained thickness disposed between spherical segment surfaces of the first end bearing connector first metal member and the first metal first laminate end structural bond shim.

In an embodiment the second end structural chemical adhesive epoxy post-elastomeric mold bond 122 is comprised of a spherical shell segment, and preferably consists essentially of a maintained thickness cured structural chemical adhesive in the shape of a segment of a spherical shell with a maintained thickness disposed between spherical segment surfaces of the second end bearing connector first metal member and the second metal first laminate end structural bond shim. Preferably the first end bearing connector first metal member 116 and the first metal first laminate end structural bond shim 106 consist essentially of the same metal composition. Preferably the second end bearing connector second metal member 120 and the second metal first laminate end structural bond shim 114 consist essentially of the same metal composition.

In an embodiment the invention includes a method of making a rotary wing aircraft bearing 20 to provide a constrained relative motion between a first rotary wing aircraft member 22 and a second rotary wing aircraft member 24. The method includes providing an elastomeric subassembly bonding mold 60 for receiving a plurality of alternating layers of interior nonelastomeric shim members 28 and interior elastomeric shim members 30, a first metal first laminate end structural bond shim 106, and a second metal distal laminate end structural bond shim 114. The method includes providing a plurality of interior nonelastomeric shim members 28. The method includes providing a plurality of interior elastomeric shim members 30. The method includes providing a first metal first laminate end structural bond shim 106. The method includes providing a second metal distal laminate end structural bond shim 114. The method includes disposing the interior nonelastomeric shim members 28, the interior elastomeric shim members 30, the first metal first laminate end structural bond shim 106, and the second metal distal laminate end structural bond shim 114 in the elastomeric subassembly bonding mold 60 with the interior nonelastomeric shim members and the interior elastomeric shim members alternating and sandwiched between the first metal first laminate end structural bond shim 106 and the second metal distal laminate end structural bond shim 114. The method includes mold bonding the interior nonelastomeric shim members 28, the interior elastomeric shim members 30, the first metal first laminate end structural bond shim 106 and the second metal distal laminate end structural bond shim 114 together in the elastomeric subassembly bonding mold 60 to provide an elastomeric mold bonded laminated subassembly 26 with the alternating layers of interior nonelastomeric shim members 28 and interior elastomeric shim members 30 sandwiched between the first metal first laminate end structural bond shim 106 and the second metal distal laminate end structural bond shim 114, the elastomeric mold bonded laminated subassembly 26 having an elastomeric subassembly tensile strength ESTS (≤1200 psi) between the first metal first laminate end structural bond shim 106 and the second metal distal laminate end structural bond shim 114, preferably with ESTS (≤1200 psi). The method includes providing a post-elastomeric mold bond structural chemical adhesive epoxy 150. The method includes providing a first end bearing connector first metal member 116 for connecting to the first rotary wing aircraft member. The method includes providing a second end bearing connector second metal member 120 for connecting to the second rotary wing aircraft member. The method includes bonding the first end bearing connector first metal member 116 and the first metal first laminate end structural bond shim 106 with the post-elastomeric mold bond structural chemical adhesive epoxy to provide a first end structural epoxy bond 118 having an elongation of at least 11% and a first end tensile strength FETS. Preferably the first end structural epoxy bond 118 elongation is at least 17%, preferably at least 19%, preferably with elongation ranges from 11 to 27%, preferably 17-26%, and preferably 19-25%. Preferably the first end structural epoxy bond first end tensile strength FETS≥1200 psi, preferably ≥2500 psi, preferably ≥2750 psi, preferably ≥3000 psi, preferably in the adhesive strength range of 3000 to 5000 psi in shear and tension. The method includes bonding the second end bearing connector second metal member 120 and the second metal first laminate end structural bond shim 114 with the post-elastomeric mold bond structural chemical adhesive epoxy 150 to provide a second end structural epoxy bond 122 having an elongation of at least 11%. Preferably the first end structural epoxy bond 122 elongation is at least 17%, preferably at least 19%, preferably with elongation ranges from 11 to 27%, preferably 17-26%, and preferably 19-25%. Preferably the second end structural epoxy bond has a second end tensile strength SETS≥1200 psi, preferably ≥2500 psi, preferably ≥2750 psi, preferably ≥3000 psi, preferably in the adhesive strength range of 3000 to 5000 psi in shear and tension, with SETS≥ESTS and FETS≥ESTS. In an embodiment the method includes providing a plurality of spherical shell segment interior nonelastomeric shim members 28, providing a first spherical shell segment metal first laminate end structural bond shim 106, and providing a second spherical shell segment metal distal laminate end structural bond shim 114. Preferably the method includes maintaining a post-elastomeric mold bond structural chemical adhesive bond thickness between the first end bearing connector first metal member 116 and the first metal first laminate end structural bond shim 106 during an adhesive bond cure time to provide a first spherical shell segment bond 118, and maintaining a post-elastomeric mold bond structural chemical adhesive bond thickness between the second end bearing connector second metal member 120 and the second metal second laminate end structural bond shim 114 during the adhesive bond cure time to provide a second spherical shell segment bond 122. Preferably the first end bearing connector first metal member and the first metal first laminate end structural bond shim are comprised of a first metal composition. Preferably the second end bearing connector second metal member and the second metal first laminate end structural bond shim are comprised of a second metal composition. Preferably the method includes maintaining a post-elastomeric mold bond structural chemical adhesive bond thickness between the first end bearing connector first metal member and the first metal first laminate end structural bond shim during an adhesive bond cure time to provide a first end post-elastomeric mold bond structural chemical adhesive bond thickness, and maintaining a post-elastomeric mold bond structural chemical adhesive bond thickness between the second end bearing connector second metal member and the second metal second laminate end structural bond shim during the adhesive bond cure time to provide a second end post-elastomeric mold bond structural chemical adhesive bond thickness. Preferably the method includes providing a fixturing jig 152, and disposing the rotary wing aircraft bearing 20 in the fixturing jig during the adhesive bond cure time to maintain bond thickness.

In an embodiment the invention includes a rotary wing aircraft bearing 20 to provide a constrained relative motion between a first rotary wing aircraft member and a second rotary wing aircraft member. The bearing 20 includes an elastomeric mold bonded laminated subassembly 26, the elastomeric mold bonded laminated subassembly including a plurality of mold bonded alternating layers of interior nonelastomeric shim members 28 and interior elastomeric shim members 30, the interior elastomeric shim members 30 including a first laminate end elastomeric shim 30' and a distal second laminate end elastomeric shim 30". The first laminate end elastomeric shim 30' has a first side 100 mold bonded to a first end interior nonelastomeric shim member 102 and a second side 104 mold bonded to a first metal first laminate end structural bond shim 106. The distal second laminate end elastomeric shim 30" has a first side 108 mold bonded to a distal second end interior nonelastomeric shim member 110 and a second side 112 mold bonded to a second metal distal end member, the elastomeric mold bonded laminated subassembly having an elastomeric subassembly tensile strength ESTS (≤1200 psi) between the first metal first laminate end structural bond shim 106 and the second metal distal end member. The rotary wing aircraft bearing includes a first end bearing connector first metal member 116 for connecting to the first rotary wing aircraft member, a first end structural chemical adhesive epoxy post-elastomeric mold bond 118 between the first end bearing connector first metal member 116 and the first metal first laminate end structural bond shim 106, the first end structural epoxy bond 118 having an elongation of at least 11% and a first end tensile strength FETS≥ESTS. Preferably, the first end structural epoxy bond has an elongation of at least 17%, preferably at least 19%, preferably with elongation ranges from 11 to 27%, preferably 17-26%, and preferably 19-25%. Preferably, the first end structural epoxy bond has first end tensile strength FETS≥1200 psi, preferably ≥2500 psi, preferably ≥2750 psi, preferably ≥3000 psi, preferably in the adhesive strength range of 3000 to 5000 psi in shear and tension. Preferably the second metal distal end member is mechanically grounded to the second rotary wing aircraft member. Preferably the first end structural chemical adhesive epoxy post-elastomeric mold bond 118 is comprised of a spherical shell segment, and preferably consists essentially of a maintained thickness cured structural chemical adhesive in the shape of a segment of a spherical shell with a maintained thickness disposed between spherical segment surfaces of the first end bearing connector first metal member and the first metal first laminate end structural bond shim. Preferably the first end structural chemical adhesive epoxy post-elastomeric mold bond 118 is tubular, and preferably consists essentially of a maintained thickness cured structural chemical adhesive tube with a maintained thickness disposed between surfaces of the first end bearing connector first metal member 116 and the first metal first laminate end structural bond shim 106. Preferably the first end structural chemical adhesive epoxy post-elastomeric mold bond 118 is comprised of a conical shell segment, and preferably consists essentially of a maintained thickness cured structural chemical adhesive conical shell segment with a maintained thickness disposed between surfaces of the first end bearing connector first metal member and the first metal first laminate end structural bond shim. Preferably the first end bearing connector first metal member and the first metal first laminate end structural bond shim consist essentially of the same metal composition. Preferably the second metal distal end member is comprised of a tube. Preferably the distal second end interior nonelastomeric shim member has a shim thickness Tinteriorshim and the second metal distal end member tube has a tube thickness Ttube with Ttube>5 Tinteriorshim. Preferably the first metal first laminate end structural bond shim has a shim thickness Texteriorshim with Ttube>5 Texteriorshim. Preferably the first end interior nonelastomeric shim member has a shim thickness Tinteriorshim and the first metal first laminate end structural bond shim has a shim thickness Texteriorshim with Texteriorshim≥Tinteriorshim.

In an embodiment the invention includes a method of making a rotary wing aircraft bearing to provide a constrained relative motion between a first rotary wing aircraft member and a second rotary wing aircraft member. The method includes providing an elastomeric subassembly bonding mold for receiving a plurality of alternating layers of interior nonelastomeric shim members and interior elastomeric shim members, a first metal first laminate end structural bond shim, and a second metal distal end member. The method includes providing a plurality of interior nonelastomeric shim members. The method includes providing a plurality of interior elastomeric shim members. The method includes providing a first metal first laminate end structural bond shim. The method includes providing a second metal distal end member. The method includes disposing the interior nonelastomeric shim members, the interior elastomeric shim members, the first metal first laminate end structural bond shim, and the second metal distal end member in the elastomeric subassembly bonding mold with the interior nonelastomeric shim members and the interior elastomeric shim members alternating and sandwiched between the first metal first laminate end structural bond shim and the second metal distal end member. The method includes mold bonding the interior nonelastomeric shim members, the interior elastomeric shim members, the first metal first laminate end structural bond shim and the second metal distal end member together in the elastomeric subassembly bonding mold to provide an elastomeric mold bonded laminated subassembly with the alternating layers of interior nonelastomeric shim members and interior elastomeric shim members sandwiched between the first metal first laminate end structural bond shim and the second metal distal end member, the elastomeric mold bonded laminated subassembly having an elastomeric subassembly tensile strength ESTS (≤1200 psi) between the first metal first laminate end structural bond shim and the second metal distal end member. The method includes providing a post-elastomeric mold bond structural chemical adhesive epoxy. The method includes providing a first end bearing connector first metal member for connecting to the first rotary wing aircraft member. The method includes bonding the first end bearing connector first metal member and the first metal first laminate end structural bond shim with the post-elastomeric mold bond structural chemical adhesive epoxy to provide a first end structural epoxy bond having an elongation of at least 11%, and a first end tensile strength FETS with FETS≥ESTS. Preferably first end structural epoxy bond has an elongation of at least 17%, preferably at least 19%, preferably with elongation ranges from 11 to 27%, preferably 17-26%, and preferably 19-25%. Preferably the first end tensile strength FETS≥1200 psi, preferably ≥2500 psi, preferably ≥2750 psi, preferably ≥3000 psi, preferably in the adhesive strength range of 3000 to 5000 psi in shear and tension. Preferably the method includes providing a plurality of spherical shell segment interior nonelastomeric shim members, and providing a first spherical shell segment metal first laminate end structural bond shim. Preferably the method includes maintaining a post-elastomeric mold bond structural chemical adhesive bond thickness between the first end bearing connector first metal member and the first metal first laminate end structural bond shim during an adhesive bond cure time to provide a first spherical shell segment bond. Preferably the first end bearing connector first metal member and the first metal first laminate end structural bond shim are comprised of a first metal composition. Preferably method the includes maintaining a post-elastomeric mold bond structural chemical adhesive bond thickness between the first end bearing connector first metal member and the first metal first laminate end structural bond shim during an adhesive bond cure time to provide a first end post-elastomeric mold bond structural chemical adhesive bond thickness. Preferably the method includes providing a fixturing jig, disposing the rotary wing aircraft bearing in the fixturing jig during the adhesive bond cure time. In an embodiment the first end structural chemical adhesive epoxy post-elastomeric mold bond is comprised of a spherical shell segment, and preferably consists essentially of a maintained thickness cured structural chemical adhesive in the shape of a segment of a spherical shell with a maintained thickness disposed between spherical segment surfaces of the first end bearing connector first metal member and the first metal first laminate end structural bond shim. Preferably the first end structural chemical adhesive epoxy post-elastomeric mold bond is tubular, and preferably consists essentially of a maintained thickness cured structural chemical adhesive tube with a maintained thickness disposed between surfaces of the first end bearing connector first metal member and the first metal first laminate end structural bond shim. In an embodiment the first end structural chemical adhesive epoxy post-elastomeric mold bond is comprised of a conical shell segment, and preferably consists essentially of a maintained thickness cured structural chemical adhesive conical shell segment with a maintained thickness disposed between surfaces of the first end bearing connector first metal member and the first metal first laminate end structural bond shim. In an embodiment the second metal distal end member is comprised of a tube. Preferably the distal second end interior nonelastomeric shim member has a shim thickness Tinteriorshim and the second metal distal end member tube has a tube thickness Ttube with Ttube>5 Tinteriorshim. Preferably the first metal first laminate end structural bond shim has a shim thickness Texteriorshim with Ttube>5 Texteriorshim. Preferably the interior nonelastomeric shim members have a shim thickness Tinteriorshim and the first metal first laminate end structural bond shim has a shim thickness Texteriorshim with Texteriorshim≥Tinteriorshim.

The structural chemical adhesive epoxy post-elastomeric mold bond preferably has the high strengths and elongations before permanent yielding occurs. Preferably the structural chemical adhesive epoxy post-elastomeric mold bond is on the order of twice as strong as the elastomeric mold bonded laminated subassembly, preferably at least two and half times as strong, and preferably at least three times as strong. Preferably the structural chemical adhesive epoxy post-elastomeric mold bond structural epoxy bond has the elongation of at least 11% to fracture, preferably with we need elongations of in the range of about 25%. Preferably the structural chemical adhesive epoxy post-elastomeric mold bond elongation of at least 11%, is at least 17%, preferably at least 19%, preferably with elongation ranges from 11 to 27%, preferably 17-26%, and preferably 19-25%. The structural chemical adhesive epoxy post-elastomeric mold bond preferably has the tensile strength greater than 1200 psi, preferably ≥2500 psi, preferably ≥2750 psi, preferably ≥3000 psi, and preferably in the adhesive strength range of 3000 to 5000 psi in shear and tension, and preferably the structural adhesive has a high enough elongation-to-fracture to survive the elastic flexing of the bonded to rotary wing aircraft member with the elastomeric mold bonded laminated subassembly experience initiated damage.

Preferably the structural chemical adhesive epoxy post-elastomeric mold bonds are formed from high elongation, high strength epoxies with favorable cures that do not harm vulcanize-bonded elastomeric packages and exceed the elastomer strength, with the epoxies elongation comparable with the rotary wing aircraft member surviving longer than the elastomer subassembly.

In an embodiment the structural chemical adhesive epoxy post-elastomeric mold bonds is formed from an Epibond™ adhesive epoxy, preferably Epibond™ 1590. In an embodiment the structural chemical adhesive epoxy post-elastomeric mold bonds is formed from an Hysol™ adhesive epoxy, preferably Hysol™ 9359.3 Preferably the epoxies include beads, preferably glass beads, such as 0.005 inch diameter glass beads. In an embodiment the invention includes utilizing existing fully vulcanize elastomeric bonding molds and modifying such to receive the subassemblies without the normal rotary wing aircraft members in the mold. The metal laminate end structural bond shims bonding shims are vulcanize-bonded on one surface and then later outside the mold structurally bonded on the other.

Preferably the material metal laminate end structural bonding shim is of the same type of the major metal rotary wing aircraft member it is structurally bonded to. In preferred embodiments using newly designed molds that do not accept the rotary wing aircraft members and the inner and outer laminate end structural bonding shims are not as thick as the needed to fit an existing part mold. FIG. 1 illustrates a spherical bearing subassembly for an existing part mold with the epoxy bonding shims having a thickness greater than the interior nonelastomeric shims.

When elastomeric mold bonded laminated subassembly vulcanization bonding is complete, the end bonding shims are treated with an epoxy metal preparation. The metal preparation preferably does not negatively impact the elastomer subassembly package, yet ensures a reliable structural bond. Contaminants need to be cleaned from the bonding shim and the preferred dimensional characteristics of the structural bond with about 0.005-0.010 inch bond line clearance are provided.

Figure 2A:
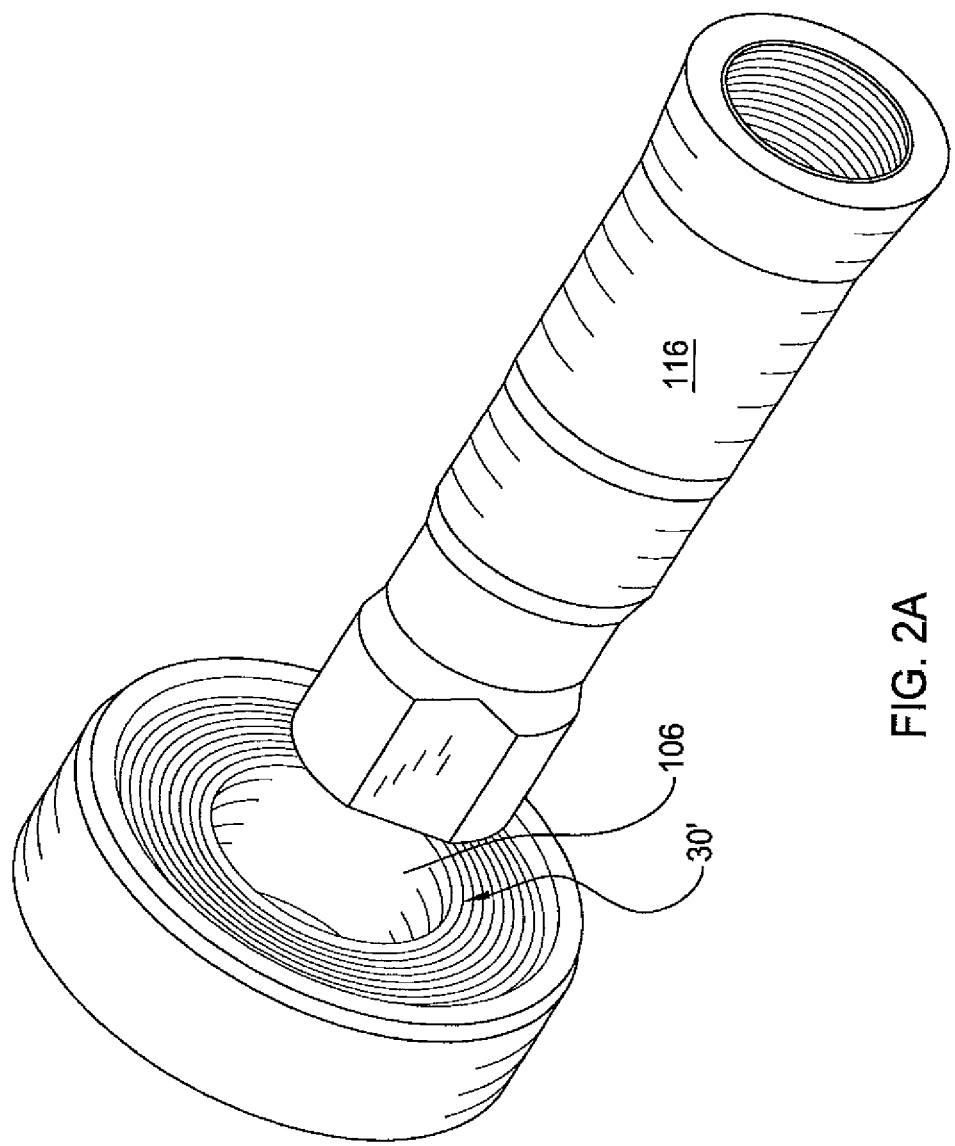
Figure 2B:
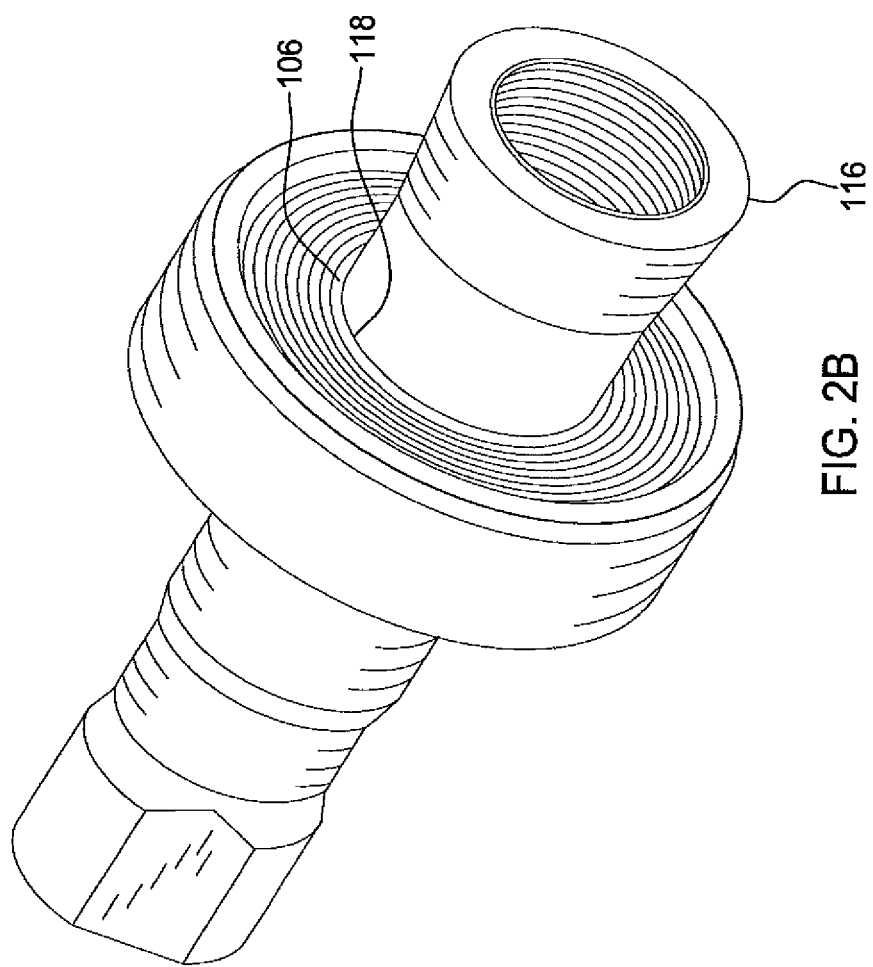
Figure 3A:
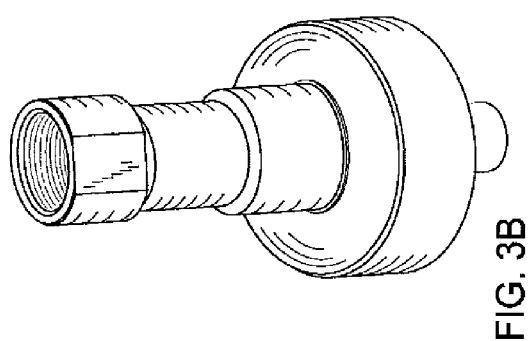
FIG. 3A-D illustrate elastomeric laminated tubular bearings.
Figure 3B:
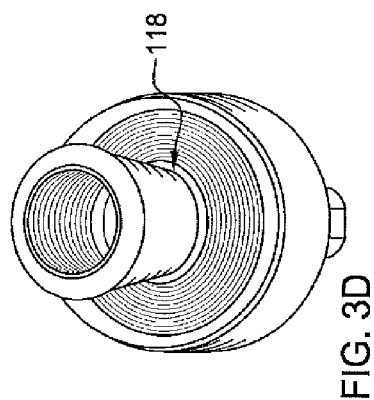
Figure 3C:
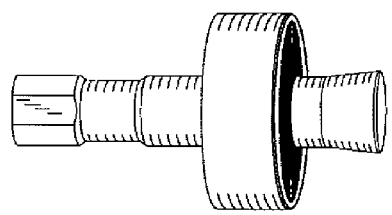
Figure 3D:
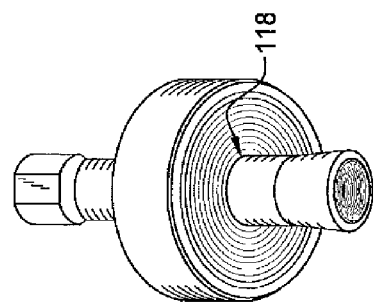
Figure 4:
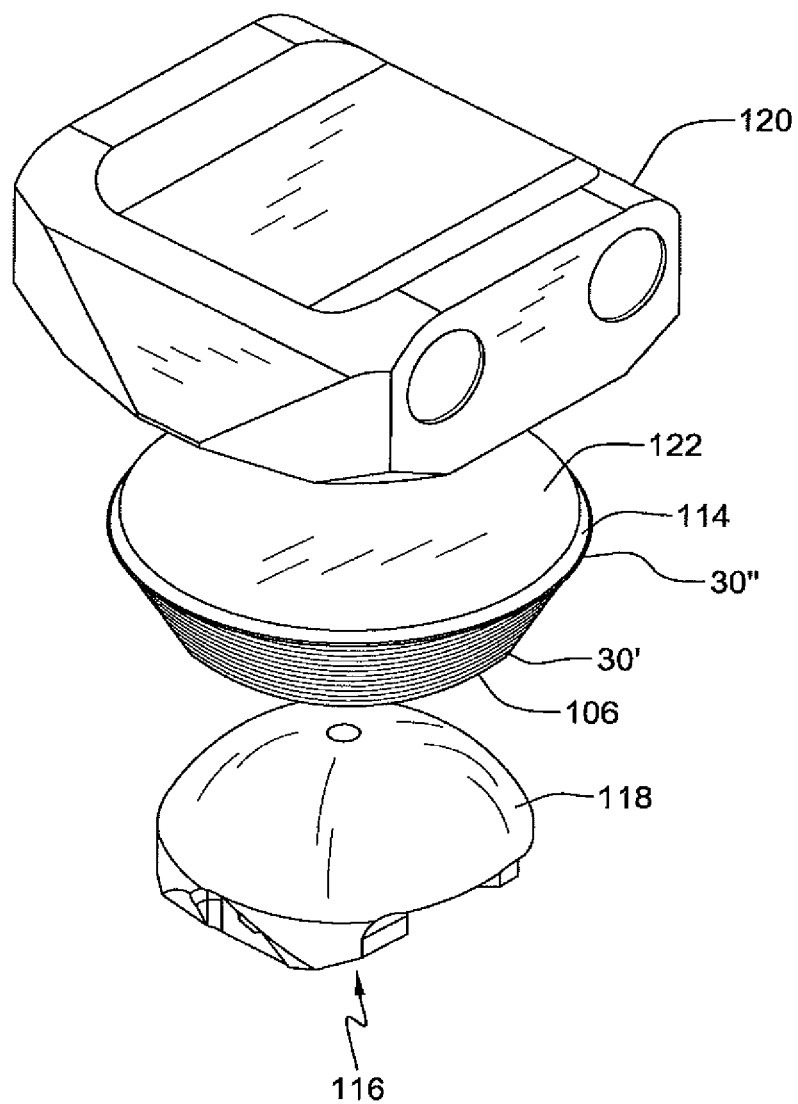
FIG. 4 illustrates a spherical bearing subassembly between first and second end bearing connector metal members.
Figure 5:
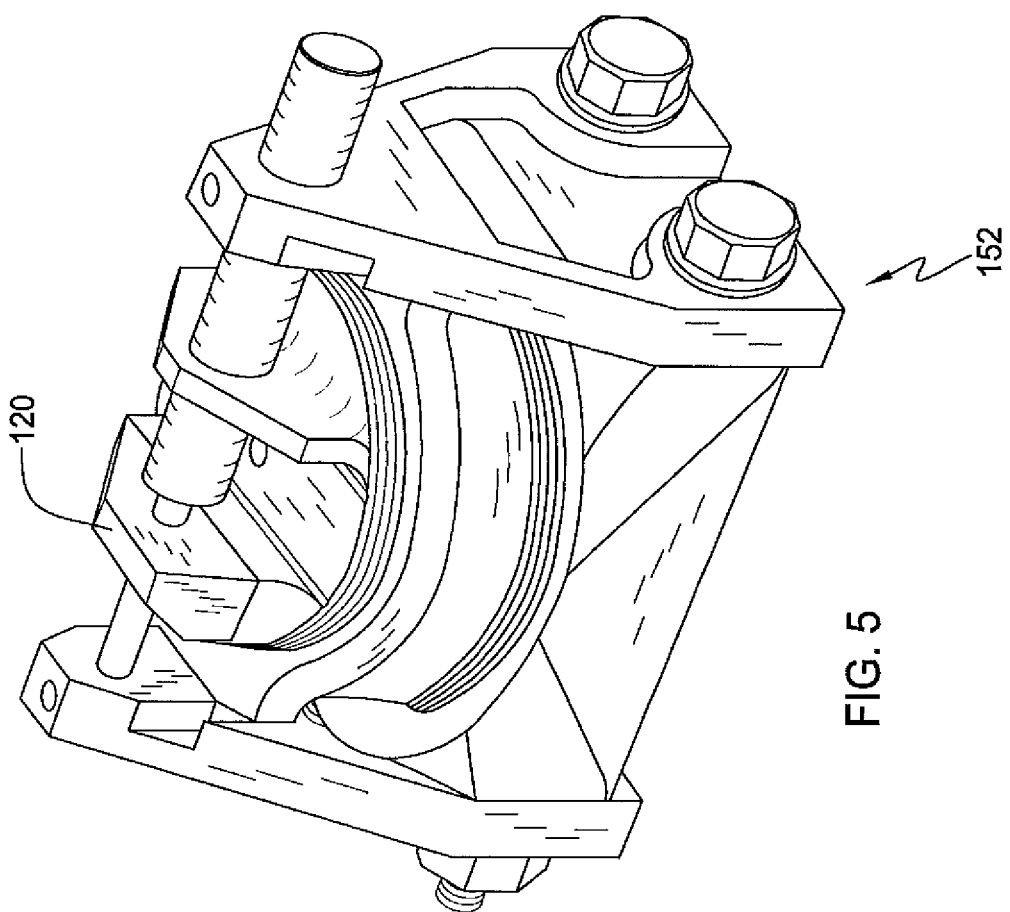
FIG. 5 illustrates a spherical bearing subassembly between first and second end bearing connector metal members held in a fixturing jig.

Preferably fixtures such as fixturing jigs 152 are provided to maintain epoxy bond dimensional characteristics, preferably with rotary wing aircraft bearing disposed in a fixturing jig during the adhesive bond cure time. Preferably with tubular bearings such as illustrated in FIG. 2-3 with tube forms and low angle conical packages utilize a low angle conical bonding surface that can be fixated to an axial dimension and preferably a clocking dimension to provide a bond line characteristic centered about 0.0075 inch thick resultant structural bond line and orientation between the bonded inner and outer members. Preferably two degrees of freedom are locked in space per structural bond joint. Preferably spherical thrust-type bearings and quasi-flat bearings utilize structural bonding fixtures to assure the bond line characteristic centered about 0.0075 inch nominal bond line exists. FIG. 4 illustrates a spherical bearing subassembly such as shown in FIG. 1 between the first end bearing connector first metal member and the second end bearing connector second metal member for the epoxy bonds. FIG. 5 illustrates such held in a fixturing jig 152 to maintain the epoxy bonds dimensions while the epoxy is curing.

In embodiments the uncured wet epoxy, fixture, inner member, outer member and elastomeric subassembly package are oven cured to provide the epoxy bond. The temperature and time should minimally impact the elastomer package based on design allowables, preferably with cure times such as three hours at 150 degree F. or four hours at 140 degree F. Preferably the cure temperature is controlled to assure a full epoxy cure and to prevent undue heating of the elastomer subassembly package.

In preferred methods the mold and the elastomeric subassembly are designed together. Preferably the metal materials either side of the structural epoxy bond are maintained in common to inhibit thermal stresses in the structural bond.

Figure 6A:
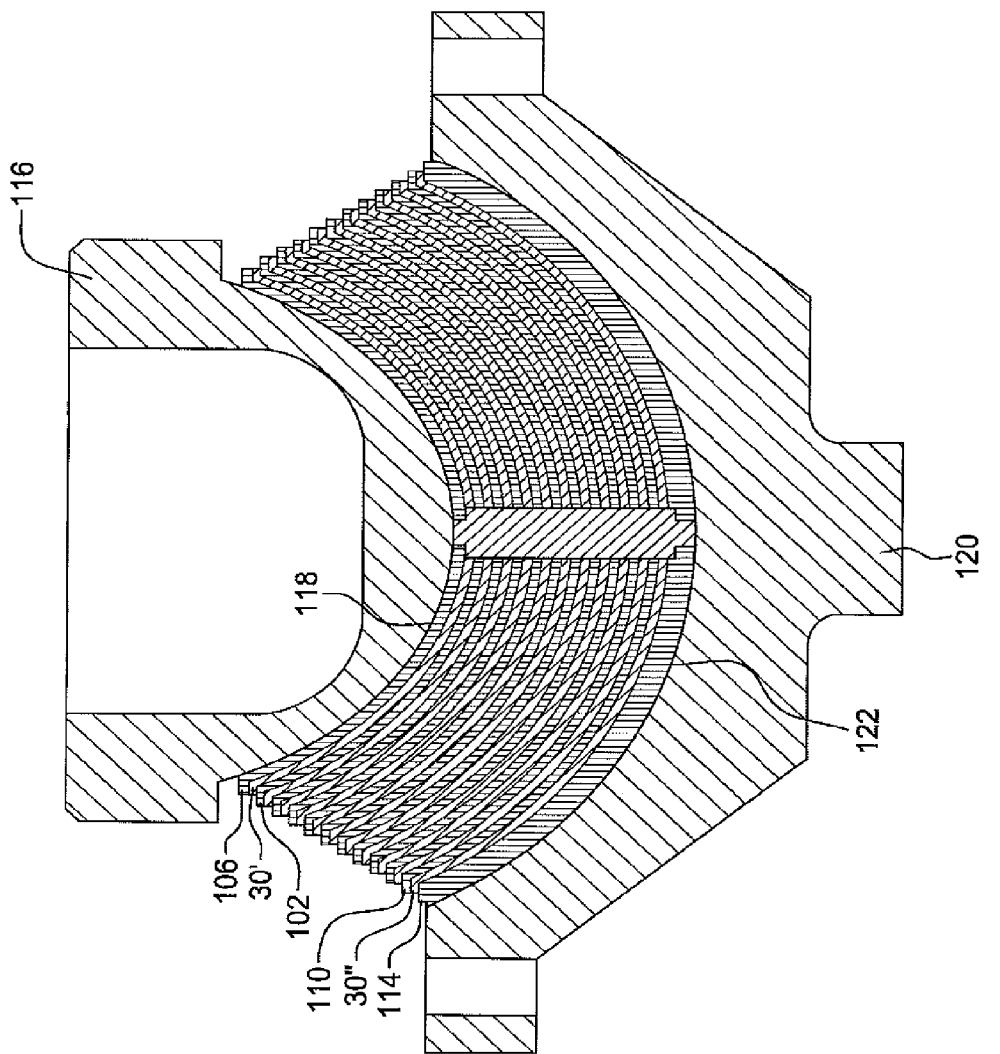
Figure 6B:
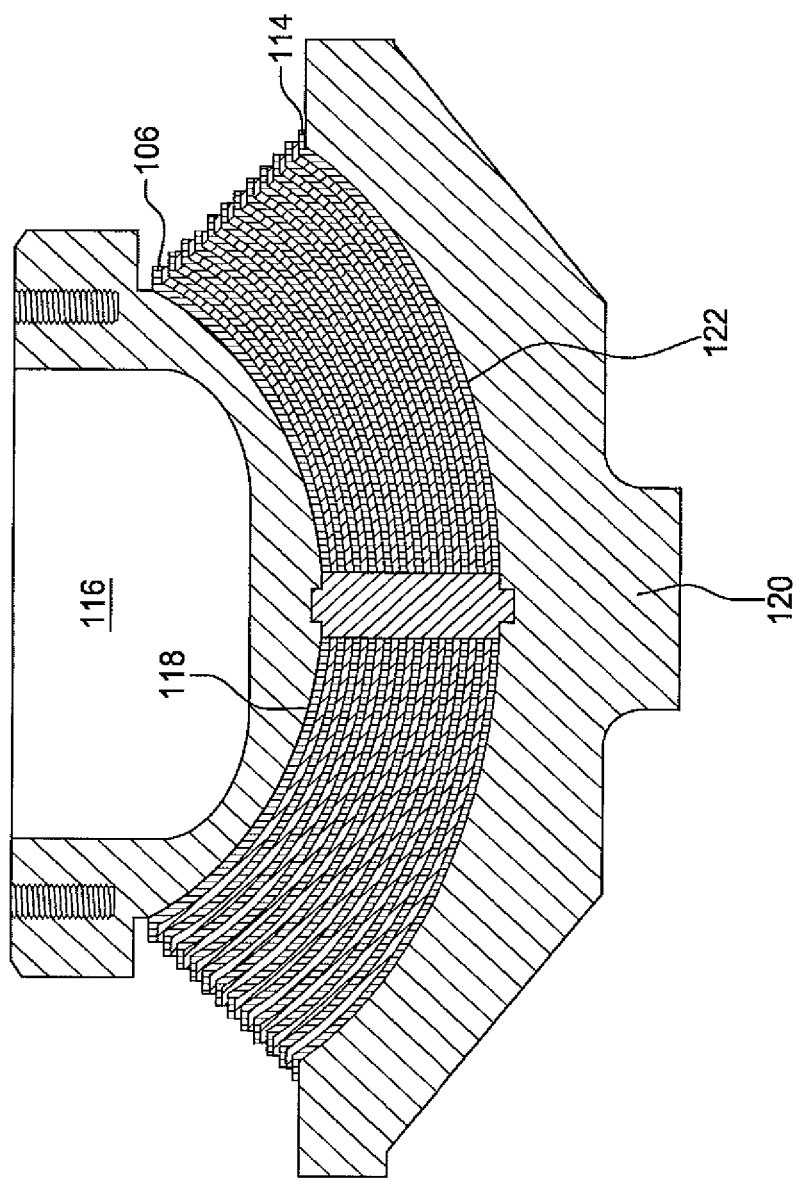
Figure 6D:
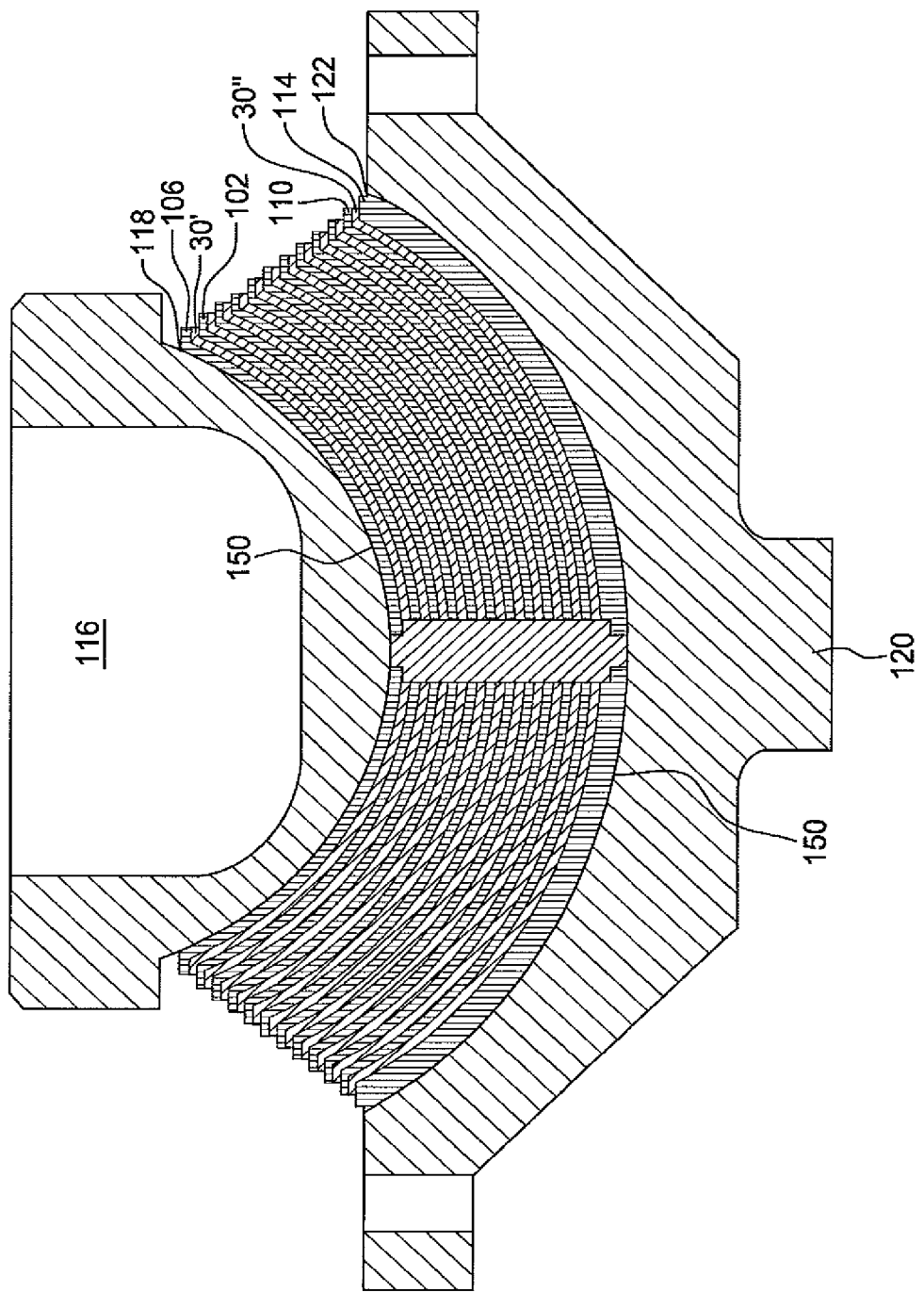
Figure 7B:
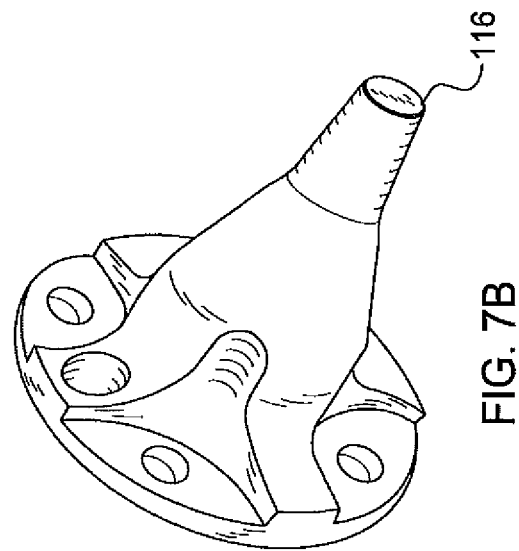
FIG. 7A-C illustrate elastomeric laminated tubular bearings with tubular bearing elastomeric mold bonded laminated subassemblies with structural chemical adhesive post-elastomeric mold bonding between the end bearing connector metal members and the laminate end structural bond shims.
Figure 7A:
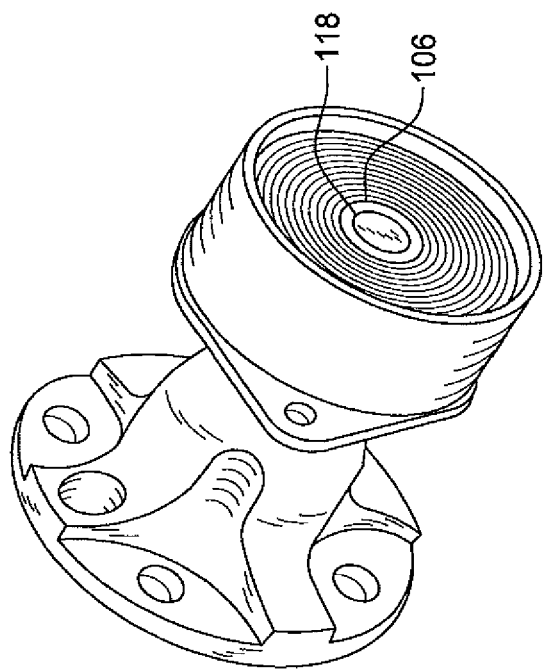
Figure 7C:
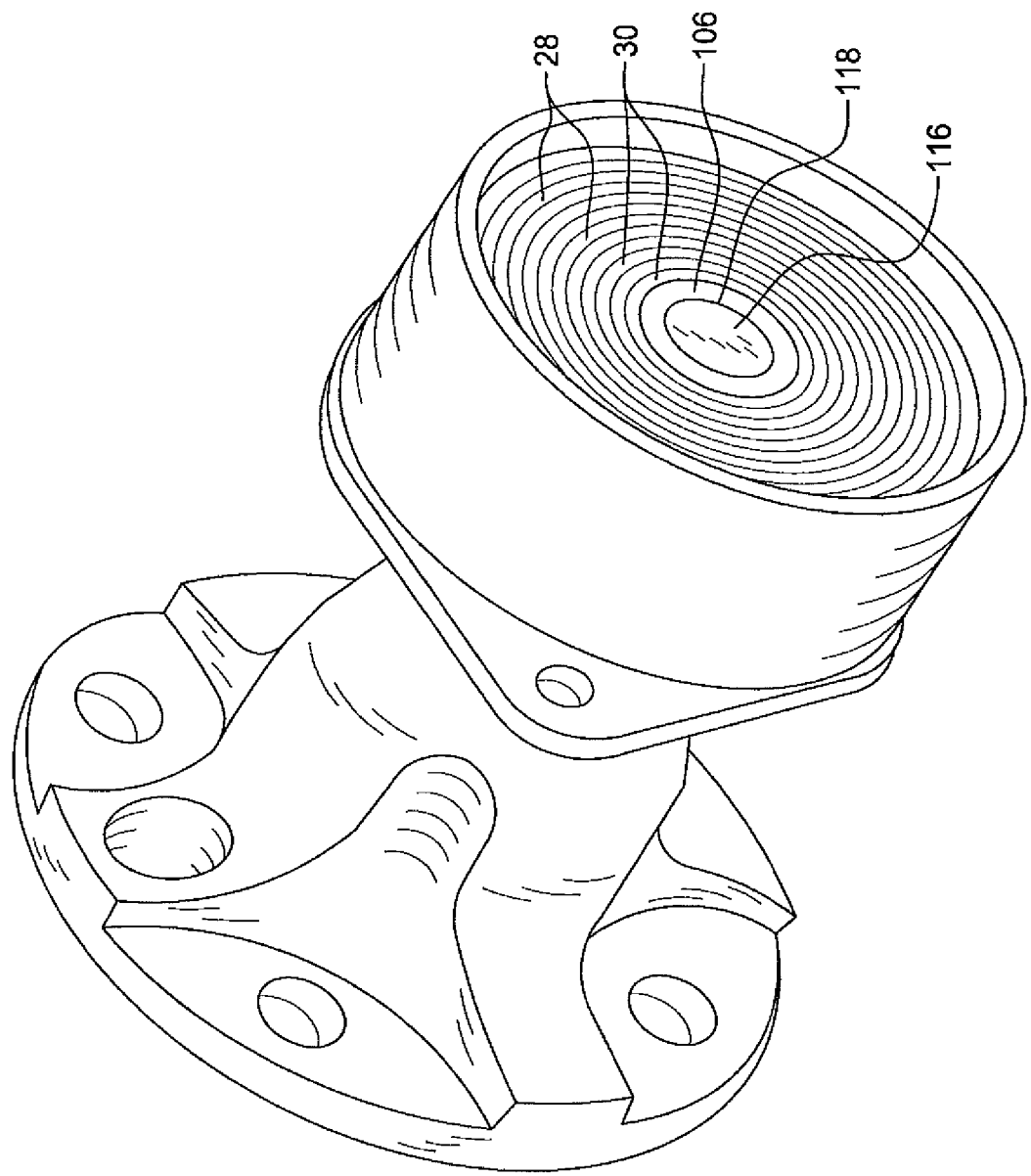
Figure 9:
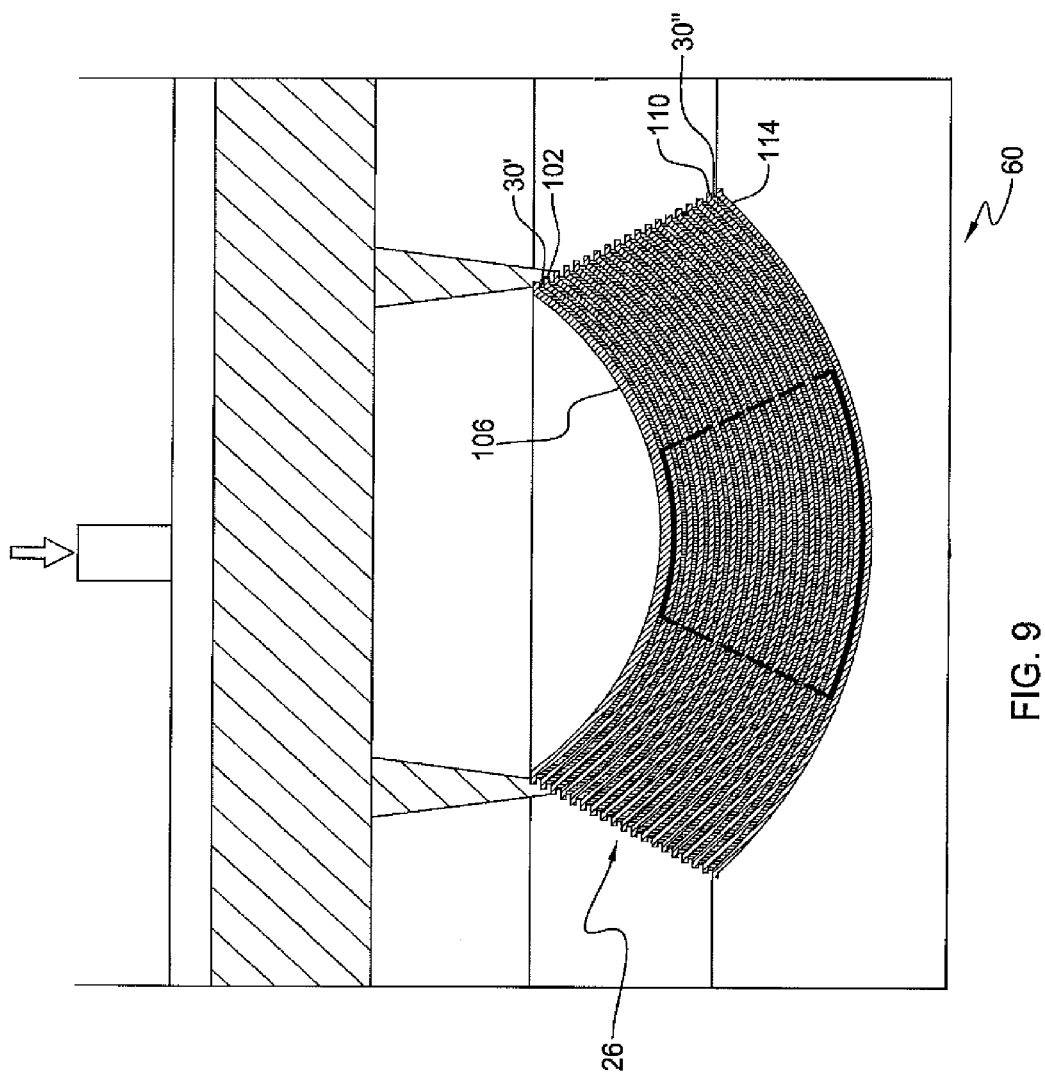
FIG. 9 illustrates an embodiment of making bearings with spherical bearing elastomeric mold bonded laminated subassemblies.

FIG. 6 illustrates a spherical bearing elastomeric mold bonded laminated subassembly with a first end bearing connector first metal member for structural chemical adhesive post-elastomeric mold bonding between the first end bearing connector first metal member and the first metal first laminate end structural bond shim. FIG. 8-9 illustrate embodiments of making bearings with spherical bearing elastomeric mold bonded laminated subassemblies.

It will be apparent to those skilled in the art that various modifications and variations can be made to the invention without departing from the spirit and scope of the invention. Thus, it is intended that the invention cover the modifications and variations of this invention provided they come within the scope of the appended claims and their equivalents. It is intended that the scope of differing terms or phrases in the claims may be fulfilled by the same or different structure(s) or step(s).

The invention claimed is:

1. A rotary wing aircraft bearing to provide a constrained relative motion between a first rotary wing aircraft member and a second rotary wing aircraft member,
   an elastomeric mold bonded laminated subassembly, said elastomeric mold bonded laminated subassembly including a plurality of mold bonded alternating layers of interior nonelastomeric shim members and interior elastomeric shim members, said interior elastomeric shim members including a first laminate end elastomeric shim and a distal second laminate end elastomeric shim,
   said first laminate end elastomeric shim having a first side mold bonded to a first end interior nonelastomeric shim member and a second side mold bonded to a first metal first laminate end structural bond shim,
   said distal second laminate end elastomeric shim having a first side mold bonded to a distal second end interior nonelastomeric shim member and a second side mold bonded to a second metal distal laminate end structural bond shim, said elastomeric mold bonded laminated subassembly having an elastomeric subassembly tensile strength ESTS between said first metal first laminate end structural bond shim and said distal second laminate end elastomeric shim,
   said rotary wing aircraft bearing including a first end bearing connector first metal member for connecting to said first rotary wing aircraft member, a first end structural chemical adhesive post-elastomeric mold bond between said first end bearing connector first metal member and said first metal first laminate end structural bond shim, said first end structural chemical adhesive post-elastomeric mold bond having an elongation of at least 11%, and a first end tensile strength FETS with FETS ≥ESTS,
   said rotary wing aircraft bearing including a second end bearing connector second metal member for connecting to said second rotary wing aircraft member, a second end structural chemical adhesive post-elastomeric mold bond between said second end bearing connector second metal member and said second metal first laminate end structural bond shim, said second end structural chemical adhesive post-elastomeric mold bond having an elongation of at least 11%, and a second end tensile strength SETS with SETS ≥ESTS.

2. A rotary wing aircraft bearing as claimed in claim 1, wherein said first end structural chemical adhesive post-elastomeric mold bond is comprised of a spherical shell segment.

3. A rotary wing aircraft bearing as claimed in claim 1, wherein said second end structural chemical adhesive post-elastomeric mold bond is comprised of a spherical shell segment.

4. A rotary wing aircraft bearing as claimed in claim 1, wherein said first end bearing connector first metal member and said first metal first laminate end structural bond shim consist essentially of the same metal composition.

5. A rotary wing aircraft bearing as claimed in claim 1, wherein said second end bearing connector second metal member and said second metal distal laminate end structural bond shim consist essentially of the same metal composition.

6. A method of making a rotary wing aircraft bearing to provide a constrained relative motion between a first rotary wing aircraft member and a second rotary wing aircraft member, said method including:
   providing an elastomeric subassembly bonding mold for receiving a plurality of alternating layers of interior nonelastomeric shim members and interior elastomeric shim members, a first metal first laminate end structural bond shim, and a second metal distal laminate end structural bond shim, providing a plurality of interior nonelastomeric shim members, providing a plurality of interior elastomeric shim members, providing a first metal first laminate end structural bond shim, providing a second metal distal laminate end structural bond shim, disposing said interior nonelastomeric shim members, said interior elastomeric shim members, said first metal first laminate end structural bond shim, and said second metal distal laminate end structural bond shim in said elastomeric subassembly bonding mold with said interior nonelastomeric shim members and said interior elastomeric shim members alternating and sandwiched between said first metal first laminate end structural bond shim and said second metal distal laminate end structural bond shim, mold bonding said interior nonelastomeric shim members, said interior elastomeric shim members, said first metal first laminate end structural bond shim and said second metal distal laminate end structural bond shim together in said elastomeric subassembly bonding mold to provide an elastomeric mold bonded laminated subassembly with said alternating layers of interior nonelastomeric shim members and interior elastomeric shim members sandwiched between said first metal first laminate end structural bond shim and said second metal distal laminate end structural bond shim, said elastomeric mold bonded laminated subassembly having an elastomeric subassembly tensile strength ESTS between said first metal first laminate end structural bond shim and said second metal distal laminate end structural bond shim, providing a post-elastomeric mold bond structural chemical adhesive, providing a first end bearing connector first metal member, providing a second end bearing connector second metal member, bonding said first end bearing connector first metal member and said first metal first laminate end structural bond shim with said post-elastomeric mold bond structural chemical adhesive to provide a first end structural bond having an elongation of at least 11%, and a first end tensile strength FETS, and bonding said second end bearing connector second metal member and said second metal distal laminate end structural bond shim with said post-elastomeric mold bond structural chemical adhesive to provide a second end structural bond having an elongation of at least 11%, and a second end tensile strength SETS with SETS ≥ESTS and FETS ≥ESTS.

7. A method of making a rotary wing aircraft bearing as claimed in claim 6, wherein providing a plurality of interior nonelastomeric shim members, providing a first metal first laminate end structural bond shim, and providing a second metal distal laminate end structural bond shim, includes providing a plurality of spherical shell segment interior nonelastomeric shim members, providing a first spherical shell segment metal first laminate end structural bond shim, and providing a second spherical shell segment metal distal laminate end structural bond shim.

8. A method of making a rotary wing aircraft bearing as claimed in claim 7 including maintaining a post-elastomeric mold bond structural chemical adhesive bond thickness between said first end bearing connector first metal member and said first metal first laminate end structural bond shim during an adhesive bond cure time to provide a first spherical shell segment bond, and maintaining a post-elastomeric mold bond structural chemical adhesive bond thickness between said second end bearing connector second metal member and said second metal distal laminate end structural bond shim during said adhesive bond cure time to provide a second spherical shell segment bond.

9. A method as claimed in claim 6 wherein said first end bearing connector first metal member and said first metal first laminate end structural bond shim are comprised of a first metal composition.

10. A method as claimed in claim 6 wherein said second end bearing connector second metal member and said second metal distal laminate end structural bond shim are comprised of a second metal composition.

11. A method as claimed in claim 6 including maintaining a post-elastomeric mold bond structural chemical adhesive bond thickness between said first end bearing connector first metal member and said first metal first laminate end structural bond shim during an adhesive bond cure time to provide a first end post-elastomeric mold bond structural chemical adhesive bond thickness, and maintaining a post-elastomeric mold bond structural chemical adhesive bond thickness between said second end bearing connector second metal member and said second metal distal laminate end structural bond shim during said adhesive bond cure time to provide a second end post-elastomeric mold bond structural chemical adhesive bond thickness.

12. A method as claimed in claim 11, including a providing a fixturing jig, disposing said rotary wing aircraft bearing in said fixturing jig during said adhesive bond cure time.

13. A rotary wing aircraft bearing to provide a constrained relative motion between a first rotary wing aircraft member and a second rotary wing aircraft member, said bearing including an elastomeric mold bonded laminated subassembly, said elastomeric mold bonded laminated subassembly including a plurality of mold bonded alternating layers of interior nonelastomeric shim members and interior elastomeric shim members, said interior elastomeric shim members including a first laminate end elastomeric shim and a distal second laminate end elastomeric shim, said first laminate end elastomeric shim having a first side mold bonded to a first end interior nonelastomeric shim member and a second side mold bonded to a first metal first laminate end structural bond shim, said distal second laminate end elastomeric shim having a first side mold bonded to a distal second end interior nonelastomeric shim member and a second side mold bonded to a second metal distal end member, said elastomeric mold bonded laminated subassembly having an elastomeric subassembly tensile strength ESTS between said first metal first laminate end structural bond shim and said second metal distal end member, said rotary wing aircraft bearing including a first end bearing connector first metal member for connecting to said first rotary wing aircraft member, a first end structural chemical adhesive post-elastomeric mold bond between said first end bearing connector first metal member and said first metal first laminate end structural bond shim, said first end structural bond having an elongation of at least of at least 11%, and a first end tensile strength FETS ≥ESTS, said second metal distal end member mechanically grounded to said second rotary wing aircraft member.

14. A rotary wing aircraft bearing as claimed in claim 13, wherein said first end structural chemical adhesive post-elastomeric mold bond is comprised of a spherical shell segment.

15. A rotary wing aircraft bearing as claimed in claim 13, said first end structural chemical adhesive post-elastomeric mold bond is tubular.

16. A rotary wing aircraft bearing as claimed in claim 15, said first end structural chemical adhesive post-elastomeric mold bond is comprised of a conical shell segment.

17. A rotary wing aircraft bearing as claimed in claim 13, wherein said first end bearing connector first metal member and said first metal first laminate end structural bond shim consist essentially of the same metal composition.

18. A rotary wing aircraft bearing as claimed in claim 13, wherein said second metal distal end member is comprised of a tube.

19. A rotary wing aircraft bearing as claimed in claim 18 wherein said distal second end interior nonelastomeric shim member has a shim thickness $T_{interiorshim}$, and said second metal distal end member tube has a tube thickness $T_{tube}$ with $T_{tube} > 5\ T_{interiorshim}$.

20. A rotary wing aircraft bearing as claimed in claim 18 wherein said first metal first laminate end structural bond shim has a shim thickness $T_{exteriorshim}$ with $T_{tube} > 5\ T_{exteriorshim}$.

21. A rotary wing aircraft bearing as claimed in claim 13 wherein said first end interior nonelastomeric shim member has a shim thickness $T_{interiorshim}$ and said first metal first laminate end structural bond shim has a shim thickness $T_{exteriorshim}$ with $T_{exteriorshim} \geq T_{interiorshim}$.

22. A method of making a rotary wing aircraft bearing to provide a constrained relative motion between a first rotary wing aircraft member and a second rotary wing aircraft member, said method including:
providing an elastomeric subassembly bonding mold for receiving a plurality of alternating layers of interior nonelastomeric shim members and interior elastomeric shim members, a first metal first laminate end structural bond shim, and a second metal distal end member,
providing a plurality of interior nonelastomeric shim members,
providing a plurality of interior elastomeric shim members,
providing a first metal first laminate end structural bond shim,
providing a second metal distal end member,
disposing said interior nonelastomeric shim members, said interior elastomeric shim members, said first metal first laminate end structural bond shim, and said second metal distal end member in said elastomeric subassembly bonding mold with said interior nonelastomeric shim members and said interior elastomeric shim members alternating and sandwiched between said first metal first laminate end structural bond shim and said second metal distal end member,
mold bonding said interior nonelastomeric shim members, said interior elastomeric shim members, said first metal first laminate end structural bond shim and said second metal distal end member together in said elastomeric subassembly bonding mold to provide an elastomeric mold bonded laminated subassembly with said alternating layers of interior nonelastomeric shim members and interior elastomeric shim members sandwiched between said first metal first laminate end structural bond shim and said second metal distal end member, said elastomeric mold bonded laminated subassembly having an elastomeric subassembly tensile strength ESTS between said first metal first laminate end structural bond shim and said second metal distal end member, providing a post-elastomeric mold bond structural chemical adhesive, providing a first end bearing connector first metal member, bonding said first end bearing connector first metal member and said first metal first laminate end structural bond shim with said post-elastomeric mold bond structural chemical adhesive to provide a first end structural bond having an elongation of at least 11%, and a first end tensile strength FETS with FETS ≥ESTS.

23. A method of making a rotary wing aircraft bearing as claimed in claim 22, wherein providing a plurality of interior nonelastomeric shim members, providing a first metal first laminate end structural bond shim, includes providing a plurality of spherical shell segment interior nonelastomeric shim members, providing a first spherical shell segment metal first laminate end structural bond shim.

24. A method of making a rotary wing aircraft bearing as claimed in claim 23 including maintaining a post-elastomeric mold bond structural chemical adhesive bond thickness between said first end bearing connector first metal member and said first metal first laminate end structural bond shim during an adhesive bond cure time to provide a first spherical shell segment bond.

25. A method as claimed in claim 22 wherein said first end bearing connector first metal member and said first metal first laminate end structural bond shim are comprised of a first metal composition.

26. A method as claimed in claim 22 including maintaining a post-elastomeric mold bond structural chemical adhesive bond thickness between said first end bearing connector first metal member and said first metal first laminate end structural bond shim during an adhesive bond cure time to provide a first end post-elastomeric mold bond structural chemical adhesive bond thickness.

27. A method as claimed in claim 26, including a providing a fixturing jig, disposing said rotary wing aircraft bearing in said fixturing jig during said adhesive bond cure time.

28. A method as claimed in claim 22, wherein said first end structural chemical adhesive post-elastomeric mold bond is comprised of a spherical shell segment.

29. A method as claimed in claim 22, wherein said first end structural chemical adhesive post-elastomeric mold bond is tubular.

30. A method as claimed in claim 29, said first end structural chemical adhesive post-elastomeric mold bond is comprised of a conical shell segment.

31. A method as claimed in claim 22, wherein said second metal distal end member is comprised of a tube.

32. A method as claimed in claim 31 wherein said distal second end interior nonelastomeric shim member has a shim thickness $T_{interiorshim}$, and said second metal distal end member tube has a tube thickness $T_{tube}$ with $T_{tube} > 5\ T_{interiorshim}$.

33. A method as claimed in claim 31 wherein said first metal first laminate end structural bond shim has a shim thickness $T_{exteriorshim}$ with $T_{tube} > 5\ T_{exteriorshim}$.

34. A method as claimed in claim 22 wherein said interior nonelastomeric shim members have a shim thickness $T_{interiorshim}$, and said first metal first laminate end structural bond shim has a shim thickness $T_{exteriorshim}$ with $T_{exteriorshim} \geq T_{interiorshim}$.

* * * * *